(12) United States Patent
Akse

(10) Patent No.: US 6,419,837 B1
(45) Date of Patent: Jul. 16, 2002

(54) PROCESS FOR DESTROYING CONTAMINANTS IN CONTAMINANT-CONTAINING AQUEOUS STREAMS AND CATALYSTS USED THEREFOR

(75) Inventor: James R. Akse, Roseberg, OR (US)

(73) Assignee: Umpqua Research Company, Myrtle Creek, OR (US)

( * ) Notice: Subject to any disclaimer, the term of this patent is extended or adjusted under 35 U.S.C. 154(b) by 0 days.

(21) Appl. No.: 09/762,034

(22) PCT Filed: Aug. 5, 1999

(86) PCT No.: PCT/US99/17219
§ 371 (c)(1),
(2), (4) Date: Jan. 31, 2001

(87) PCT Pub. No.: WO00/07943
PCT Pub. Date: Feb. 17, 2000

Related U.S. Application Data
(60) Provisional application No. 60/047,353, filed on Aug. 21, 1998, and provisional application No. 60/095,614, filed on Aug. 6, 1998.

(51) Int. Cl.$^7$ .................................................. C02F 1/00
(52) U.S. Cl. ....................... 210/752; 210/757; 210/758; 210/763; 210/903
(58) Field of Search ........................... 210/752, 757, 210/758, 763, 903

(56) References Cited

U.S. PATENT DOCUMENTS

| | | | |
|---|---|---|---|
| 3,442,802 A | 5/1969 | Hamilton | |
| 3,617,540 A | 11/1971 | Bishop et al. | |
| 3,823,088 A | 7/1974 | Box et al. | |
| 3,943,055 A | 3/1976 | Korenkov et al. | |
| 4,141,828 A | 2/1979 | Okada et al. | |
| 4,159,309 A | * 6/1979 | Faul et al. | |
| 4,479,877 A | 10/1984 | Guter | |
| 4,699,720 A | 10/1987 | Harada et al. | |
| 4,720,344 A | 1/1988 | Ganczarczyk et al. | |
| 4,751,005 A | 6/1988 | Mitsui et al. | |
| 5,063,041 A | 11/1991 | Wanngard | |
| 5,069,800 A | 12/1991 | Murphy | |
| 5,118,447 A | * 6/1992 | Cox et al. | |
| 5,322,598 A | 6/1994 | Cawlfield et al. | |
| 5,382,265 A | 1/1995 | Mower | |
| 5,507,956 A | * 4/1996 | Bonse et al. | |
| 5,608,112 A | * 3/1997 | Schwartz | |
| 5,662,809 A | * 9/1997 | Bischoff et al. | |

FOREIGN PATENT DOCUMENTS

DE     39 38 835     of 1989

OTHER PUBLICATIONS

US EPA, Drinking Water Contaminant Candidate List, EPA 815–F–97–001, 1997.

California Department of Health Services, Division of Drinking Water and Environmental Management, Drinking Water Program, Perchlorate in California Drinking Water, 1997.

(List continued on next page.)

*Primary Examiner*—Betsey Morrison Hoey
(74) *Attorney, Agent, or Firm*—Marger Johnson & McCollom, P.C.

(57) ABSTRACT

The process of this invention destroys contaminants in a contaminant-containing aqueous stream. The subject process comprises providing a contaminant-containing aqueous feed stream including an initial amount of at least one of a group of contaminants including perchlorates, nitrates, and nitrites. The contaminant-containing aqueous feed stream includes a reducing agent. Next the reducing agent-containing, contaminant-containing aqueous stream is heated. Finally, the heated contaminant-containing aqueous stream is contacted with an oxidation-reduction catalyst for a period of time sufficient for reducing the excess amount of any of the perchlorates, nitrates, and nitrites contaminants by at least about 90%.

22 Claims, 7 Drawing Sheets

OTHER PUBLICATIONS

US EPA, 1992, Provisional Non–Cancer and Cancer Toxicity Values for Potassium Perchlorate (CASRN 7778–74–7)( Aerojet General Corp.) Memorandum from Joan S. Dollarhide, Superfund Health Risk Technical Support Center, Environmental Criteria and Assessment Office, Office of Research and Developement, to Dan Stralka, US EPA Region IX.

US EPA, 1995, Correspondence from Joan S. Dollarhide, National Center for Environmental Assessment Office of Research and Development to Mike Girrard, Chairman, Perchlorate Study Group.

Standbury, J.B. and Wyngaarden, J.B. "Effect of perchlorate on the human thyroid gland.", Metabolism, 1, 533–539, 1952.

Godley, A.F. and J.B. Stanbury. "Preliminary Experience in the Treatment of Hyperthyroidism with Potassium Perchlorate" Endocrinology. 14, 70–78, 1954.

Crooks, J. and E.J. Wayne. "A Comparison of Potassium Perchlorate, Methylthiouracil, and Carbimazole in the Treatment of Thyrotoxicosis", Lancet., 1, 401–404, 1960.

Morgans, M.E. and W.R. Trotter. "Potassium Perchlorate in Thyrotoxicosis", Br. Med. J., 2:1086–1087, 1960.

Hobson, Q.J.G. "Aplastic Anemia due to Treatment with Potassium Percholate", Br. Med. J., 1, 1368–1369, 1961.

Johnson, R.S. and W.G. Moore. "Fatal Aplastic Anemia after Treatment of Thyrotoxicosis with Potassium Perchlorate", Br. Med. J., 1, 1369–1371, 1961.

Fawcett, J.W. and C.W.F. Clarke. "Aplastic Anemia due to Potassium Perchlorate", Br. Med. J., 1, 1537, 1961.

Krevans, J.R., S.P. Asper, Jr. and W.F. Rienhoff. "Fatal Aplastic Anemia Following the Use of Potassium Perchlorate in Thyrotoxicosis", J. Amer. Med. Assoc., 181(2), 162–164, 1962.

Gjemdal, N. "Fatal Aplastic Anemia Following the Use of Potassium Perchlorate in Thyrotoxicosis". Acta Med. Scand., 174(2), 129–131, 1963.

Barzilai, D. and Sheinfeld, M.. "Fatal Complications Following the Use of Potassium Perchlorate in Thyrotoxicosis". Israel J. Med. Sci., 301(3), 190–199,. 1966.

Connell, J.M.C. "Long–term Use of Potassium Perchlorate", Postgrad Med. J., 57, 516–517, 1981.

Burgi, H., M. Bengueral, J. Knopp, H. Kohler, and H. Studer. "Influence of Perchlorate on the Secretion of Non–thyroxine Iodine by the Normal Human Thyroid Gland", Europ. J. Clin. Invest., 4, 65–69, 1974.

Brabant, G., P. Bergman, C.M. Kirsch, J. Kohrle, R.D. Resch, and A. vonzur Muhlen. "Early Adaptation of Thyrotropin and Thyroglobulin Secretion to Experimentally Decreased Iodine Supply in Man", Metabolism., 41, 1093–1096, 1992.

Mannisto, P.T., T. Rantum, and J. Leppaluoto. "Effects of Methylmercaptoimidazole (MMI), Propylthiouracil (PTU), Potassium Perchlorate ($KClO_4$) and Potassium Iodide (KI) on the Serum Concentrations of Thyrotrophin (TSH) and Thyroid Hormones in the Rat", Acta Endocrin., 91, 271–281, 1979.

Kessler, F.J. and H.J. Krunkemper. "Experimantal Thyroid Tumors Caused by Many Years of Potassium Perchlorate Administration", Klin. Wochenschr., 44, 1154–1156, 1966.

Brooks AirForce Military Home Page. Demonstration of Ammonium Perchlorate Degredation. www.brooks.af.mil/HSC/AL/EQ/prod13.ht, 1997.

US EPA Regulated Inorganic Contaminants in Water www.epa.gov/OGWDW/dwh/t–ion/ioc–t.txt.

Hseu, T.M. and Rechnitz, A., "Analytical study of a perchlorate ion selective membrane electrode.", Anal. Lett., 1, 629–640, 1968.

Press, W.H., Flannery, B.P., Teukolsky, S.A., and Vetterling, W.T., Numerical Recipes: The Art of Scientific Computing, Cambridge, New York, 1986.

Standard Methods for the Examination of Water and Wastewater—19th Edition, edited by A.D. Eaton, L.S. Clesceri, A.E. Greenberg, and M.A.H. Franson, American Public Health Association, Washington, D.C., 1995.

Methods for Chemical Analysis of Water and Wastewater, U.S. Environmental Protection Agency, Cincinnati, OH, 1997.

Mussan, A.E. and Sukhotin, A.M., Russ. J. Inorg. Chem., 4, 276, 1959.

Levy, J.B., J. Phys. Chem., 66, 1092, 1963.

Heath, G.A. and Majer, J.R., Trans. Faraday Soc., 60, 1783, 1964.

Sibbet, D.J. and Lobato, J.M., "Investigation of the mechanism of combustion of composite solid propellants", Aerojet Report N. 1782, Aerojet–General Corp., Azusa, California, 1960.

Swaddle, T.W., Miasek, V.I., and Henderson, M.P., "Kinetics of Thermal Decomposition of Aqueous Perchloric Acid", Can. J. Chem., 49, 317–324, 1971.

Brown, G.M. "The reduction of chlorate and perchlorate ions at an active titanium electrode", J. Electroanal. Chem., 198, 319–330, 1986.

Process Design Manual for Nitrogen Control, Office of Technology Transfer of the US EPA, 1975.

Akse, J.R., and Jolly, C.D., "Catalytic Oxidation for Treatment of ECLSS and PMMS Waste Streams", Technical Paper Series SAE 911539, presented 21st International Conference on Environmental Systems, San Francisco, Jul. 15–18, 1991.

Akse, J.R., "Catalytic Methods using Molecular Oxygen for Treatment of PMMS and ECLSS Waste Streams", Final Report, Contract NAS8–38490, NASA–MSFC, 1992.

Akse, J.R., Thompson, J., Scott, B., Jolly, C., and Carter, D.L., "Catalytic Oxidation for Treatment of ECLSS and PMMS Waste Streams", Technical Paper SAE 921274, presented 22nd International Conference on Environmental Systems, Seattle, Jul. 13–16, 1992.

Atwater, J.E., Akse, J.R., McKinnis, J.A., and Thompson, J.O., "Low Temperature Aqueous Phase Catalytic Oxidation of Phenol", Chemosphere, 34(1), 203–212, 1997.

Atwater, J.E., Akse, J.R., McKinnis, J.A., and Thompson, J.O., "Aqueous Phase Heterogeneous Catalytic Oxidation of Trichloroethylene", Appl. Catal. B.., 11, L11–L18, 1996.

Atwater, J.E., Akse, J.R., and Thompson, J.O., "Reactor Technology for Aqueous Phase Catalytic Oxidation of Organics", Phase I Final Report submitted to the U.S. Air Force, Environics Directorate, Tyndall AFB, Contract No. F08637 C6022, 1996.

Akse, J.R., Atwater, J.E., Schussel, L.J., and Thompson, J.O., "Electrochemically Generated, Hydrogen Peroxide Boosted Aqueous Phase Catalytic Oxidation", Final Report NASA Contract NAS9–19281, 1995.

Akse, J.R., et al., "In Situ Hydrogen peorxide Generation for Use as a Disinfectant and as an Oxidant for Water Recovery by Aqueous Phase Catalytic Oxidation", SAE Technical Paper Series 961521, presented at the 26th International Conference in Environmental Systems, Monterey, 1996.

Akse, J.R., Atwater, J.E., Schussel, L.J., Thomson, J.O., and Wheeler, R.R. Electrochemical Water Recovery Process for Treatment of Urine and Other Biological Waste Streams, Final Report Contract NAS9–18528, Prepared for Johnson Space Center, Jun. 1993.

Akse, J.R., Atwater, J.E., Thompson, J.O., and Wheeler, R.R, Electrochemical Water Recovery System for Producing Potable Water from Composite Wastewater Generated in Enclosed Habitats, in Water Purification by Photocatalytic, Photochemical, and Electrochemical Processes, Rose, T.L., Conway, B.E., Murphy, O.J., and Rudd, E.J, Eds., Electrochemical Society, 1994.

Sadana, A., and Katzer, J.R., Catalytic Oxidation of Phenol in Aqueous Solution over Copper Oxide, Ind. Eng. Chem., Fundam., 13, 127, 1974.

Baldi, G., Goto, S., Chow, C.–K., and Smith, J.M., 1974, Catalytic Oxidation of Formic Acid in Water. Intraparticle Diffusion in Liquid–Filled Pores, Ind. Eng. Chem., Process Des. Develop., 13, 447.

Goto, S., and Smith, J.M., Trickle–Bed Reactor Performance I. Holdup and Mass Transfer Effects, AIChE J., 21, 706, 1975.

Goto, S., and Smith, J.M., Trickle–Bed Reactor Performance. II. Reaction Studies, AIChE J., 21, 714, 1975.

Levec, J., and Smith, J.M., Oxidation of Acetic Acid Solutions in a Trickle–Bed Reactor, AIChE J., 22, 919, 1976.

Levec, J., Herskowitz, M., and Smith, J.M., An Active Catalyst for the Oxidation of Acetic Acid Solutions, AIChE J., 22, 159, 1976.

Box, E.O., Farha, F., Jr., Polluted Water Purification, U.S. Patent 3,823,088, Jul., 1974.

Levec, J., Catalytic Oxidation of Toxic Organics in Aqueous Solution, Appl. Catal., 63, L1, 1990.

Akse, J.R., Atwater, J.E., Schussel, L.J., and Verostko, C.E., Development and Fabrication of a Breadboard Electrochemical Water Recovery System, Technical Paper SAE 932032, presented at 23rd International Conference on Environmental Systems, Colorado Springs, Jul. 1993.

* cited by examiner

System 40

PROCESS FOR DESTROYING CONTAMINANTS IN CONTAMINANT-CONTAINING AQUEOUS STREAMS AND CATALYSTS USED THEREFOR

This Appln is a 371 of PCT/US99/17219 filed Aug. 5, 1999 which claims benefit of Prov. No. 60/097,373 filed Aug. 21, 1998 which claims benefit of Prov. No. 60/095,614 filed Aug. 6, 1998.

BACKGROUND OF THE INVENTION

The US EPA currently restricts the total nitrate plus nitrite concentration (as nitrogen) in drinking water to less than 10 mg/L, and has reported that exposure to perchlorate should not exceed the 4–18 $\mu$g/L range in order to provide an adequate health protection margin. High nitrate/nitrite and perchlorate levels in drinking water have been linked to serious health problems and sometimes death. The concern over nitrate/nitrite has been driven by increasing levels of these contaminants being detected in drinking water supplies originating from both inorganic and biological sources. Inorganic sources include intense agricultural practices which contribute both ammonium and potassium nitrate fertilizers, explosives and blasting agents, heat transfer salts, glass and ceramics manufacture, matches, and fireworks. Biologically derived organonitrogen compounds are converted to nitrate in natural waters relatively rapidly. The main source for compounds is human sewage and livestock manure, which are not effectively removed by current treatment systems. Once in the environment, nitrates move rapidly into ground water reservoirs which supply drinking water. Recent studies have indicated the presence of perchlorate in drinking water wells throughout the Western United States. Perchlorate contamination of ground and surface waters originates from the manufacture and destruction of ammonium perchlorate; a strong oxidant used in the aerospace, munitions, and fireworks industries. Practical and efficient methods to treat water contaminated by these pollutants do not currently exist and are needed to insure a safe drinking water supply.

Ammonium perchlorate has been widely used by the aerospace, munitions, and fireworks industries, resulting in widespread soil and water contamination. The end of the Cold War has left the Department of Defense (DOD) with approximately 140 million pounds of ammonium perchlorate to be disposed of between 1993 and 2005. Perchlorate contamination in drinking water wells was first detected in early 1997 in northern California. These findings prompted further investigation, and perchlorate was detected in southern California wells, the Colorado River, Las Vegas wells, and Lake Mead. Although Federal drinking water standards do not currently exist for perchlorate, it has been placed on the current Drinking Water Contaminant Candidate List by the EPA.[1] There is significant concern over the human health effects of perchlorate due to its known interference with the thyroid gland's ability to utilize iodine and produce thyroid hormones. As a result of these findings, the California Department of Health Services (DHS) adopted an action level for perchlorate in drinking water of 18 $\mu$g/L.[2] This level was based upon an earlier recommendation by the EPA for a provisional reference dose (RfD) of 14 mg/kg/day.[3,4] In August of 1997, DHS notified drinking water utilities of their intent to treat perchlorate as an unregulated contaminant that must be monitored and reported to the DHS.

Perchlorate contamination has been detected in eastern Sacramento County at Aeroj et General Corporation's facility, a site previously owned by McDonnnell-Douglas, and a site previously owned by Purity Oil Company. Due to the presence of volatile organic chemicals (VOCs), contaminated groundwater at the Aerojet General site was treated and then reinjected into aquifers in the area. Monitoring of the reinjected water indicated that it contained up to 8000 $\mu$g/L of perchlorate. In February 1997, perchlorate was detected in drinking water wells in the Rancho Cordova area at levels as high as 280 $\mu$g/L. In July of 1997, DHS tested 62 wells in northern California, and detected perchlorate in 13. Of the 13, eight exceeded the 18 $\mu$g/L action level. Also, groundwater monitoring wells associated with the United Technologies Corporation in Santa Clara County yielded perchlorate concentrations as high as 180,000 $\mu$g/L, although no contamination of the drinking water systems was evident.

In southern California, perchlorate contamination has been detected in wells at Loma Linda and Redlands (5–216 $\mu$g/L) associated with past operations of the Lockheed Propulsion Company. Perchlorate was also detected at low levels in wells at Riverside, Chino, Colton, Cucamonga, and Rialto. In Los Angeles County, perchlorate has been detected in concentrations ranging from 4 to 159 $\mu$g/L in the areas of Azusa, Baldwin Park, Irwindale, La Canada, Flintridge, La Puente, Newhall, Pasadena, Santa Clarita, and West Covina. The perchlorate contamination was thought to originate from Aerojet (Azusa), the Azusa landfill, the Whittaker-Bernite site (Santa Clarita), and two Superfund sites, the Jet Propulsion Laboratory (Pasadena) and the Baldwin Park Operable Unit.

Outside of California, perchlorate has been found at levels of 5 to 9 $\mu$g/L in the Colorado River. These findings prompted testing in Nevada. In August, Nevada sites were found to contain perchlorate levels of up to 13 $\mu$g/L in drinking water wells, 1700 $\mu$g/L in the Las Vegas Wash, and 165 $\mu$g/L in Lake Mead. Monitoring wells in areas of ammonium perchlorate manufacturing were then found to have levels of 630,000 to 3,700,000 $\mu$g/L. In Utah perchlorate was found at levels of 200 $\mu$g/L at a rocket motor manufacturing facility.

Potassium perchlorate's health effects were originally discovered due to its use in the 1950's to treat Graves' disease, an autoimmune disorder in which patients develop antibodies to the thyroid stimulating hormone (TSH) receptors in the thyroid resulting in hyperthyroidism. Perchlorate was found to displace iodine in the thyroid, causing a decrease in production of triiodothyronine (T3) and tetraiodothyronine (T4), two regulating hormones which control TSH production. This effect has been shown to be reversible, with the perchlorate eventually being expelled from the thyroid. A study by Stansbury and Wyngaarden[5] was performed on Graves' disease patients following a single dose of perchlorate. Studies by Godley and Stansbury, Crooks and Wayne, Morgans and Trotter, Hobson, Johnson and Moore, Fawcett and Clarke, Krevans et al., Gjemdal, and Barzilai and Sheinfeld followed perchlorate administration to Graves' disease patients for periods up to several weeks.[6-14] Only one case by Connell[15] reported long term treatment in one patient for 22 years. Doses of perchlorate in these studies ranged from <1 mg/kg/day[5] to >20 mg/kg/day[7] with the typical exposure being 6–14 mg/kg/day. The observable effects of perchlorate include blocking of iodine uptake and discharge by the thyroid,[5] gastrointestinal irritation and skin rash,[6,7] and hematological effects including agranulocytosis and lymphadenopathy.[7,8] Seven cases of fatal aplastic anemia were reported at the same dose level, 6–14 mg/kg/day, at which other side effects occurred.[9-14]

Following these early studies, the effects of perchlorate exposure on healthy volunteers were studied by Burgi et al.[16] in five subjects for eight days at 9.7 mg/kg/day dosage levels. Brabant et al.[17] studied five subjects dosed with 12 mg/kg/day of perchlorate for four weeks. Both of these studies observed effects on the thyroid at these levels. Studies in laboratory animals have included administration of perchlorate for four days by Mannisto et al.[18] and for two years by Kessler and Krunkemper.[19] The animal studies only examined thyroid effects at dosage levels too high to evaluate the perchlorate level defined as the no observable adverse effects level (NOAEL).

The initial effort to establish a RfD for perchlorate was undertaken by the Perchlorate Study Group (PSG), a consortium of companies that use and/or manufacture perchlorates. The PSG submitted a provisional perchlorate RfD) to the EPA's National Center for Environmental Assessment Office (NCEAO) in 1995. The critical health effect cited in the PSG report was the interference with the thyroid functioning including the release of iodine from the thyroid, inhibition of iodine uptake by the thyroid, increased thyroid weight and volume, increased TSH levels, and decreased T3 and T4 thyroid regulating hormone levels. The PSG's approach to a perchlorate RfD was to select a dose level that represented the highest level tested at which no adverse effects were observed. The critical study used by the PSG in their assessment was by Brabant.[17] The PSG report recommended a RfD of 12 mg/kg/day.

In response to this report, the NCEAO derived the provisional RfD of $1 \times 10^{-4}$ mg/kg/day later used by the DHS in their recommendations. This RfD was based upon the NOAEL for potassium perchlorate in the functioning of the thyroid combined with uncertainty factors designed to account for sensitive populations, the less than chronic nature of the studies, and database deficiencies.[2,3,5] The critical study used in this assessment was that of Stansbury and Wyngaarden which was the only study to report a NOAEL for humans.[5] The NOAEL dosage was established at 0.14 mg/kg/day based on the release of iodine from the thyroid. To account for unknowns in the risk assessment process, the U.S. EPA used uncertainty factors (UF) to evaluate the NOAEL. An UF of 1000 was applied to perchlorate based upon 10 for a less than chronic study, 10 for database insufficiencies, and 10 for the protection of sensitive individuals. This resulted in a RfD of 0.00014 mg/kg/day, and a 4 $\mu$g/L drinking water limit (70 kg average weight and two liters of drinking water per day). The U.S. EPA later reviewed the findings and available data, and changed the database uncertainty factor to 3, resulting in a higher RfD of 0.0005 mg/kg/day. Using the two UF analyses, the U.S. EPA concluded, "until adequate chronic data becomes available that addresses the effects of perchlorate on the hematopoietic system (i.e., bone marrow), we feel that the provisional RfD is in the range of 1 to $5 \times 10^{-4}$ (i.e., 0.0001 to 0.0005) mg/kg/day" or 4–18 $\mu$g/L of perchlorate in drinking water.

After review of earlier attempts to establish a RfD, the International Toxicity Estimates for Risk (ITER) Peer Review Panel concluded in March of 1997 that the database for perchlorate exposure was inadequate for the development of a RfD and that additional studies were required to establish a RfD. Due to this recommendation, the PSG and the U.S. Air Force obtained funding to support new studies to assess the toxicities of perchlorate.[20] In September of 1997, the first study was initiated. New laboratory animal studies are in progress or about to begin at this time to determine the effects of perchlorate ingestion on neurobehavioral development, receptor kinetics, developmental fetal skeletal abnormalities, ADME (absorption, distribution, metabolism, and elimination), mutagenicity/genotoxicity, reproductive, and immunotoxicity. These studies will be used to fill in holes in the perchlorate database that have made it difficult for the EPA to set a RfD. The findings of these studies will be used to establish a new RfD.

Nitrate and nitrite levels in drinking water have also received intense regulatory scrutiny in the past due to their potential to cause serious health problems especially in infants and the elderly. High nitrate/nitrite levels in drinking water have been linked to serious illness and sometimes death. In infants, the conversion of nitrate to nitrite by the body can interfere with the ability of blood to carry oxygen. Under exposure to excessive nitrate levels, an acute condition can occur leading to shortness of breath and blueness of the skin (i.e., "blue baby syndrome" or methemoglobinemia). In its acute form, this may lead to rapid health deterioration over a period of days. Chronic exposure to high levels of nitrate/nitrite can lead to diuresis, and increased starchy deposits and hemorrhaging of the spleen. Current EPA regulatory limits include a Maximum Contaminant Limit (MCL) of 10 mg/L (as nitrogen) and a 10-day Health Advisory Limit (HAL) of 10 mg/L.[21] For example, a safe short term exposure for a 10 kg child consuming 1 liter of water per day over a ten day period would be 10 mg/L of total nitrate plus nitrite.

Part of the concern over nitrate/nitrite has arisen from the increasing levels of these contaminants detected in drinking water supplies. Since most nitrogenous chemicals in natural waters are converted to nitrate, all sources of combined nitrogen especially organic nitrogen and ammonia should be considered as nitrate sources. Due to its high solubility and weak retention by soils, nitrates are very mobile and move into groundwater reservoirs (i.e., aquifers) at a rate comparable to that of surface water. Biological degradation of nitrate by anaerobic denitrification reactions to form elemental nitrogen and ammonia is slow so that nitrate persists in the environment. In particular, organic nitrates originating from human sewage and livestock manure are potential sources for this type of ground water contamination. In the latter case, feedlots represent a large point source of this type of organic nitrogen pollution. Intense agricultural practices also contribute through the use of ammonium and potassium nitrate as fertilizers. Other inorganic sources of nitrate contamination include explosives and blasting agents, heat transfer salts, glass and ceramics manufacture, matches, and fireworks. The quantity of nitrate/nitrite released into the environment between 1987 and 1993 in the top fifteen states totaled $2.68 \times 10^7$ kg for water releases and $2.42 \times 10^7$ kg for land releases. Of these, nitrogeneous fertilizer contributed ~44% of the total while industrial sources accounted for ~30%.

The widespread occurrence of perchlorates and nitrate/nitrites in ground and surface water combined with the concern expressed by California's DHS and the U.S. EPA clearly demonstrate the need for new more efficient technologies to eliminate these inorganic contaminants from drinking water. Numerous technologies have been investigated for the destruction of perchlorate, but none of these provide an economical process for treating drinking water to reduce these contaminants to levels below regulatory limits. Ion exchange, reverse osmosis, and electrodialysis are current methods used to remove nitrate/nitrite from drinking water, however, in all cases nitrate/nitrite are concentrated into a brine which then must be disposed of in an appropriate repository. Assurance of safe drinking water supplies in the future will require the development of technology which can eliminate both of these inorganic contaminants from drinking water without producing additional wastes.

The decomposition of perchlorate by biological, physicochemical, electrochemical, and thermal processes has been the subject of numerous patents.[26-35] Included in these are a microbiological treatment using Vibrio dechloraticans Cuznesove B-1168 being fed acetate, ethanol, glucose, and other sugars in the absence of oxygen. The Air Force has investigated the destruction of ammonium perchlorate using Wolinella succinogenes HAP-1, an anaerobic microbe.[20] Thermal destruction of highly concentrated perchloric acid solutions and perchloric acid in the vapor phase is also well known.[26-30] The thermal decomposition of perchloric acid has been measured at moderate temperatures from 295–322° C.[30] Physical processing has been employed in which evaporation and precipitation of $KClO_4$ were used to remove perchlorate.[31,32] Electrochemical methods have also been used to reduce perchlorates to lower oxidation state chlorine compounds.[33,34] Electrochemical reduction of perchloric acid solutions has been demonstrated using a titanium cathode.[35] Prior to the current research, the catalytic reduction of perchlorates has not been actively pursued.

The elimination of nitrate and nitrite from water has been widely studied.[36-40] The primary and traditional treatment methods have been based on nitrification and denitrification using different groups of bacteria under aerobic and anaerobic conditions.[36-38] Chemical and physical processes such as reverse osmosis, ion exchange, and electrodialysis have all been considered as physico-chemical means to remove nitrate/nitrite from water.[39,40] The use of an aqueous phase catalyst in combination with an organic reductant has not been considered.

Many aqueous phase catalytic oxidation studies have been performed using dissolved molecular oxygen as the oxidant and a variety of organic contaminants as reductants. The primary objective in these studies has been the destruction of aqueous phase organic contaminants. In effect, these studies mirror the proposed perchlorate destruction process with the exception that the contaminant that is being destroyed has changed from the reductant to the oxidant.[41-64]

SUMMARY OF THE INVENTION

A process is provided for destroying contaminants in a contaminant containing aqueous stream. In the subject process, the contaminant-containing aqueous feed stream preferably comprises a contaminant-containing aqueous feed stream or aqueous brine feed stream.

The process of the present invention comprises providing the contaminant-containing aqueous feed stream including an initial amount of at least one of a group of contaminants including perchlorates, nitrates, and nitrites. In a preferred process of this invention for the destruction of perchlorate contaminants, an oxidation-reduction process is employed in which it is believed that the oxidation state of chlorine in the perchlorate (+7) contaminant is lowered, forming predominantly chloride (−1). In a preferred process for the destruction of nitrate and nitrite contaminants, it is believed that the oxidation state of nitrogen in the nitrate (+5) and nitrite (+3) contaminants is lowered, forming elemental nitrogen (0).

A reducing agent is provided in the contaminant-containing aqueous feed stream. The reducing agent can be present therein in sufficient amount to facilitate the catalytic oxidation-reduction of the present invention. However, the subject process typically includes adding a non-toxic reducing agent to the contaminant-containing aqueous feed stream. The preferred reducing agents are organic reducing agents, more preferably low molecular weight polar organic species which are highly soluble and have a terminal carbon—oxygen bond. Most preferably, the reducing agent can comprises any one of a carbohydrate, an alcohol or an organic acid, more preferably ethanol or acetic acid.

There are also preferred inorganic reductants including dissolved hydrogen and ammoniacal nitrogen species (i.e., $NH_3$ and $NH_4^+$). Other inorganic species such as hydrogen peroxide, urea, chloramines, or hydrazine hydrochloride which form oxidized by-products that are soluble may also be utilized as reducing agents.

When organic reducing agents are utilized, carbon dioxide and water are the predominant by-products from oxidation of the reductant. If inorganic reducing agents are utilized, then the chief by-products formed depend on the reducing conditions and the specific reducing agent. For example, the oxidation of hydrogen forms hydronium ions, while the oxidation of ammonia forms water, hydronium ions, and nitrogen.

Next, the reducing agent-containing, contaminant-containing aqueous stream is subjected to a heating step. The temperature to which the reducing agent-containing, contaminant-containing aqueous stream is typically raised is to a temperature of not more than about 250 degrees C., preferably to a temperature of not more than about 200 degrees C., more preferably to a temperature of not more than about 150 degrees C., and most preferably to a temperature of not more than about 50 degrees C.

The heated contaminant-containing aqueous stream is then contacted with an oxidation-reduction catalyst for a period of time sufficient for reducing the initial amount of any of the perchlorates, nitrates, and nitrites contaminants. Preferably, the step of contacting the reducing agent-containing, contaminant-containing aqueous stream with the oxidation-reduction catalyst is typically conducted for a period of time of not more than about 500 seconds, preferably not more than about 300 seconds, more preferably not more than about 150 seconds, and most preferably not more than about 50 seconds.

The oxidation-reduction catalyst is preferably a metallic oxidation-reduction heterogeneous catalyst. Oxidation-reduction catalysts can comprise chemically robust, high surface area supports impregnated with a metal, metal oxide, or with mixtures of metal salts which are subsequently reduced to metallic form. The supports are stable in aqueous solutions at the above-described reduction temperatures. The preferred supports are zirconium dioxide extrudates.

The heated contaminant-containing aqueous stream can be subject to pressure, as well as temperature, when it is contacted with an oxidation-reduction catalyst. The preferred pressures employed during the oxidation-reduction sequence is typically up to about 40 atmospheres, preferably up to about 10 atmospheres, more preferably up to about 3 atmospheres, and most preferably up to about 1 atmospheres.

The supports generally have a surface area of at least 20 $m^2/g$, preferably at least 25 $m^2/g$, more preferably at least 30 $m^2/g$, and most preferably at least 35 $m^2/g$. Moreover, the particle size of the support material is preferably up to about 2 mm, more preferably up to about 3 mm, and most preferably up to about 4 mm.

These oxidation-reduction catalysts of the present invention exhibit high activity towards the oxidation of dissolved organic species and towards the reduction of molecular oxygen and other suitable oxidants such as perchlorate, nitrate, and nitrite materials. The preferred metallic materials employed in the oxidation-reduction catalyst of this invention are platinum, palladium, and ruthenium.

The subject oxidation-reduction catalysts suitable for the process of this invention are high activity catalysts provided that the support material remains stable at the reaction conditions. Typical oxidation-reduction catalyst of this invention can comprise platinum and/or palladium and/or ruthenium catalytic metals supported on other materials. Such support materials can include titanium dioxide, cerium oxide, aluminum oxide, silicon dioxide, silicon carbide, and activated carbon. The platinum loading on typical supports employed in the process of this invention may be as high as 20% by weight, based on the weight of the support material, although a cost-benefit analysis generally can reduce this value by a factor of ten for commercial application. The ruthenium loading on these supports is preferably up to about 5.0% by weight. The palladium loading on these supports is less than about 2.0% by weight, based on the total weight of the support material.

Oxidation-reduction catalysts suitable for this process can also include other metals, metal oxides, or mixed metal oxides supported on a variety of materials. Typical metals in this group include copper, iron, cobalt, and nickel. Typical metal oxides include copper oxide with manganese oxide, chromium oxide with iron oxide, and chromium oxide with cobalt oxide. Metal and metal oxide loadings are up to about 4.0% by weight, based on the weight, based on the weight of the support material.

A preferred oxidation-reduction catalyst for the destruction of perchlorate, nitrate, and nitrite using organic reductants comprises platinum and ruthenium on zirconium dioxide. The optimal platinum loading based on performance-cost evaluation is between about 0.5 and 2.5% by weight. The optimal ruthenium loading based on performance-cost evaluation is between about 0.1 and 0.5% by weight, based on the weight of the support.

A preferred oxidation-reduction catalyst for the reduction of perchlorate, nitrate, and nitrite using dissolved hydrogen as the reductant comprises platinum, palladium, and ruthenium on zirconium dioxide. When utilizing hydrogen as the reductant, palladium containing catalysts exhibit higher reaction rates than non-palladium containing catalysts due to the high hydrogen solubility in palladium, combined with the consequent availability of hydrogen at the palladium surface. The optimal loading based on performance-cost evaluation for platinum is between 0.5 and 2.5% by weight, for palladium is between 0.5 and 2.0% by weight, and for ruthenium is between 0.1 and 0.5% by weight of the support.

A variety of reactor configurations may be utilized to perform the aqueous phase catalytic oxidation-reduction process of this invention. The preferred catalytic reactor comprises a plug flow reactor containing the catalyst bed. Reducing agents are added at the inlet at ambient temperature and pressure. The aqueous stream is then pressurized, heated, pumped through the reactor, and cooled at the outlet. Reactor temperature control and overall energy efficiency is improved by coupling inlet and outlet flows through a regenerative heat exchanger. Depending on the contaminated stream and reducing agent, perchlorate, nitrate, and nitrite will be reduced in the presence of a stoichiometric excess of the reducing agent at a kinetically determined residence time within the catalyst bed. When hydrogen is the reducing agent of choice, a stoichiometric excess of gaseous hydrogen is injected into the pressurized stream at a concentration sufficient to reduce the contaminant species at the contact time provided. The reactor operating pressure is adjusted to maintain single phase operation and to supply sufficient dissolved gas to maintain a stoichiometric excess reductant. Operating pressures and temperatures are maintained in a range as previously described above.

A preferred oxidation-reduction catalyst for the reduction of perchlorate, nitrate, and nitrite using ammonium cations as the reductant comprises platinum and ruthenium on zirconium dioxide. The optimal loading based on performance-cost evaluation for platinum is between 0.5 and 2.5% by weight, and for ruthenium is between 0.1 and 0.5% by weight of the support.

An aqueous phase catalytic reduction (APCAR) process will catalytically reduce perchlorate, nitrate, and nitrite using a variety of organic and inorganic reductants at low temperatures between 25 and 125° C. in water. An APCAR process will catalytically reduce perchlorate, nitrate, and nitrite using a variety of organic and inorganic reductants at temperatures above 150° C. in brines which contain between 1 and 12% by weight sodium chloride.

When organic reductants are utilized, carbon dioxide and water are the predominant reaction by-products. If inorganic reductants are utilized, then the chief by-products formed depend on the reduction conditions and the specific reductant.

When the heated contaminant-containing aqueous stream is contacted with an oxidation-reduction catalyst for a period of time sufficient, the initial amount of any of said perchlorates, nitrates, and nitrites contaminants is substantially reduced. More specifically, the extent of the above-described substantial reduction is preferably by at least about 90%, more preferably by at least about 92%, and most preferably by at least about 95%.

DESCRIPTION OF PREFERRED EMBODIMENTS

The process of the present invention utilizes a highly active oxidation-reduction catalyst to destroy particularly perchlorates and nitrates/nitrites contaminating aqueous streams. The development of an aqueous phase catalytic reduction (APCAR) process for the destruction of contaminants in water, particularly perchlorates and nitrates/nitrites, offers an innovative solution to potentially serious health problems.

Figure 1:
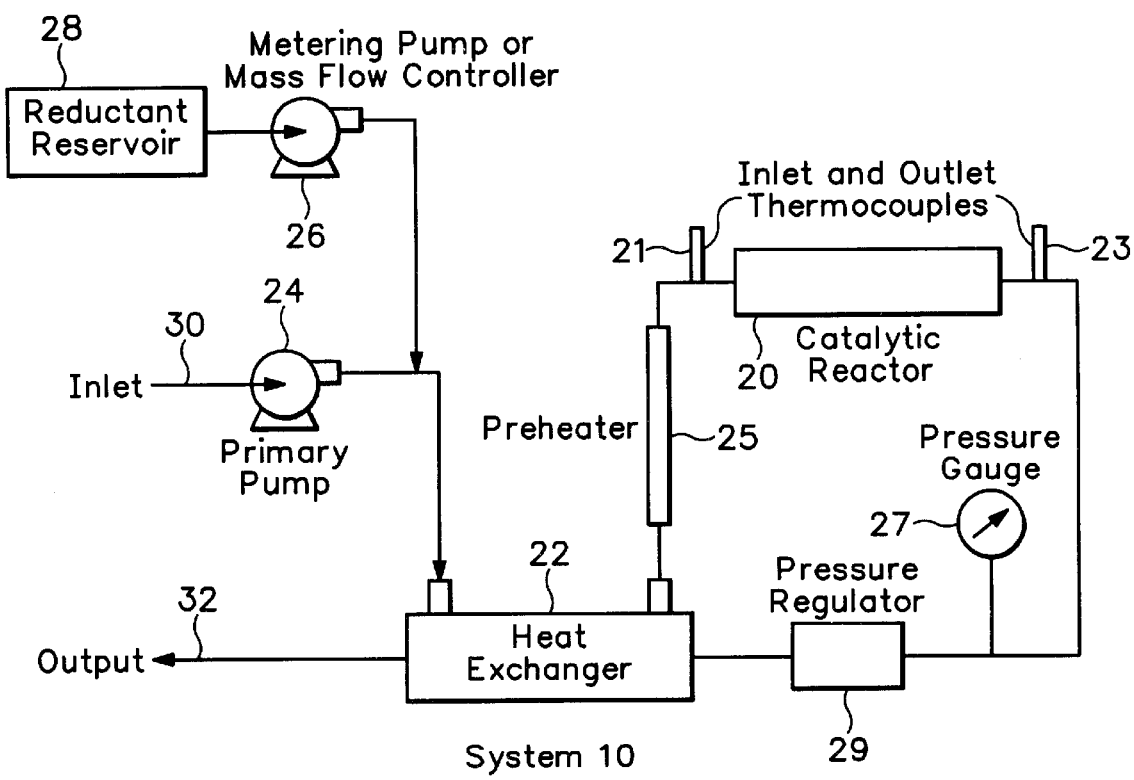
FIG. 1 is a schematic view of a system 10 of the present invention for destroying contaminants in a contaminant-containing aqueous stream using an organic reducing agent.

A schematic representation of a preferred APCAR system 10 is shown in FIG. 1. The system is configured as a plug flow reactor 20 containing an oxidation-reduction catalyst designed to promote perchlorate and/or nitrate/nitrite reduction, forms innocuous inorganic by-products. The choice of reductants and the APCAR process configuration will depend on the perchlorate or nitrate/nitrite concentration. For example, at low perchlorate concentrations the intrinsic organic carbon levels in drinking water will suffice for destruction and only a single reactor pump 24 is needed. When high concentrations of perchlorate are encountered, non-toxic organic reductants such as carbohydrates, alcohols, or organic acids are metered from the reduction reservoir 28 by the metering pump 26 into the inlet stream 30 prior to the reactor pump 24. Inorganic reductants may also be used including hydrogen gas, ammoniacal nitrogen species (i.e., NH$_3$ and NH$_4^+$), and other soluble inorganic species which form soluble oxidized by-products. Metering pumps are used to introduce water soluble reductants, while a pressurized tank coupled to a mass flow controller is utilized to introduce gaseous reductants. In the next stage, heat is transferred from the reactor's treated water to the influent water by passage through a regenerative heat exchanger 22.

In order to raise the water temperature to reaction conditions, additional heat is provided in the preheater 25. The APCAR reactor temperature is controlled through a combination of heat exchanger 22, preheater 25, and resistive heating within the reactor 20. The temperature from the preheater 25 is read by the inlet thermocouple 21, and the temperature at the outlet of the reactor 20 is read by the outlet thermocouple 23. After passage through the reactor 20, the water perchlorate and nitrate/nitrite levels are typically reduced below 5 µg/L and 10 mg/L, respectively. The amount of reductant as quantified by the Total Organic Carbon (TOC) level which decreases as the reducing agent is oxidized. The effluent water temperature is then reduced to ambient conditions following flow through the regenerative heat exchanger. The pressure in the line prior to heat exchanger 22 is determined by pressure gauge 27. The pressure can be modified, if necessary, by pressure regulator 29. The water is then available from outlet 32 for transfer to the water treatment plant for normal processing.

A catalytic reduction test system 10, similar to that shown in FIG. 1, was constructed. A 19.63 cm$^3$ plug flow reactor was filled with PRZr51 catalyst (i.e., 2% platinum and 0.5% ruthenium on zirconium oxide extrudates between 1 mm and 3 mm in diameter) and challenged with 50 ppm (mg/L) of NaClO$_4$. As a reductant, the NaClO$_4$ solution contained 50 mM of ethanol. The effluent NaClO$_4$ concentration was monitored using a perchlorate ion selective electrode (i.e. nitrate ion selective electrode) which has previously been shown to respond to ClO$_4^-$ more strongly than to NO$_3^-$.[22] Using this electrode, ClO$_4^-$ concentrations between 0.2 and 20 ppm were accurately determined.

Reaction kinetics for the reduction of NaClO$_4$ were studied as a function of flow rate and temperature. At each temperature, the effluent NaClO$_4$ concentration (C) was determined for different flow rates (Q). The residence time within the reactor (reactor space-time, τ) was determined according to the following (1), $$\tau = \frac{V_r \phi}{Q} \quad (1)$$

where φ is the fractional void volume of the packed catalyst bed and V$_r$ is the reactor volume. Since a twenty fold stoichiometric excess of ethanol was used during these runs, the reaction becomes zero order with respect to the reductant and was determined to be first order with respect to NaClO$_4$. The rate constant (k) for a psuedo first order reaction in a plug flow reactor are given by the following (2):

$$C = C_o e^{-k\tau} \quad (2)$$

Equation 2 was derived from the resulting (C, τ) ordered pairs using the Levenberg-Marquardt method.[23] Correlation coefficients (r$^2$) for the derived rate constants were calculated using a linear regression of experimentally observed concentrations versus those calculated from Equation 2. At least four data points were gathered for each temperature of operation.

Reaction kinetics experiments were conducted at three temperatures. Rate constants, which are shown as functions of temperature were then fitted to the Arrhenius expression as (1/T, ln k) ordered pairs using a least squares approximation to a linear equation, are given by the (3), $$k = Ae^{\frac{E_a}{RT}} \quad (3)$$

where T is the temperature in degrees Kelvin, E$_a$ is the Arrhenius activation energy, R is the gas constant, and A is the pre-exponential factor determined from the slope and intercept, respectively.

Figure 2:
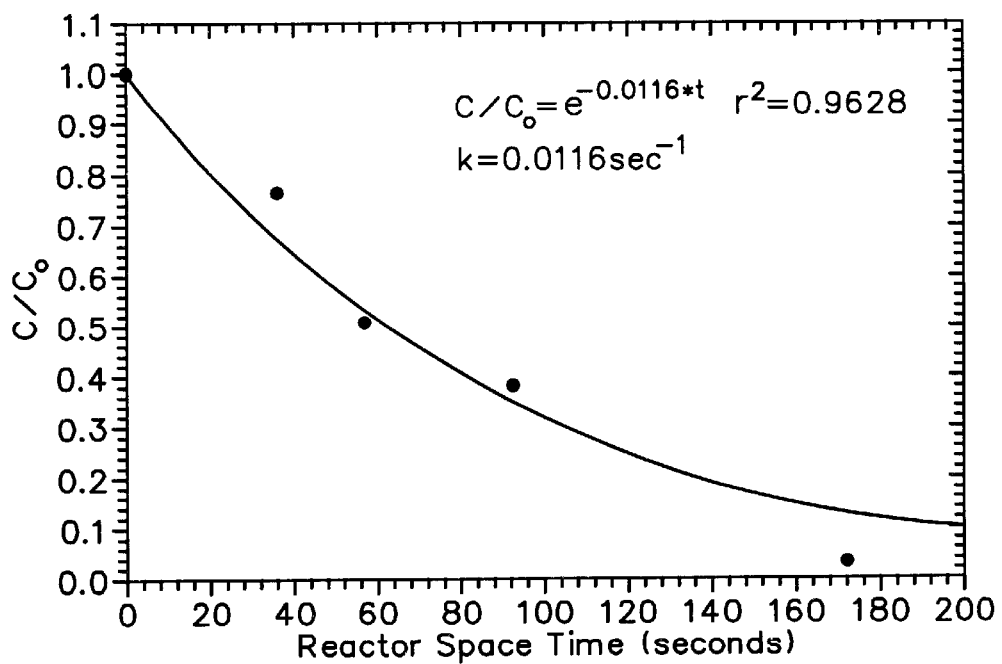
FIG. 2 is a graphical representation of the reduction of 50 mg/L $NaClO_4$, using the system described in FIG. 1 and PRZr51 oxidation-reduction catalyst, at 60 degrees C. using 50 mM ethanol as the reducing agent.
Figure 3:
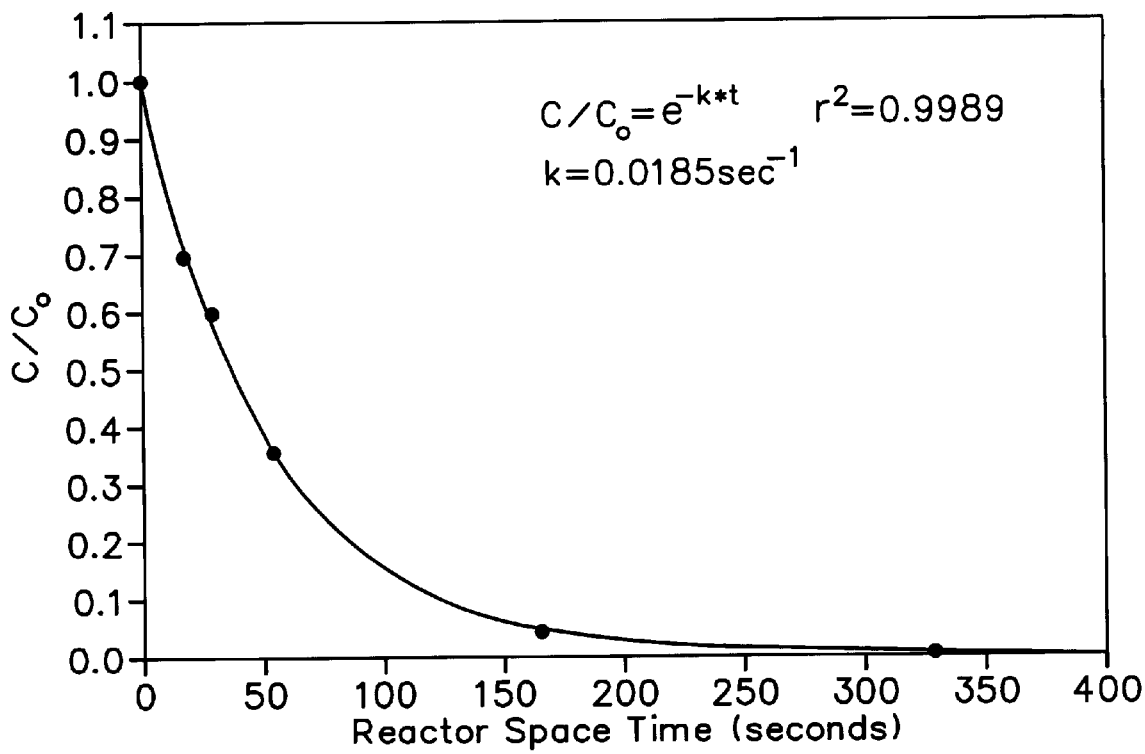
FIG. 3 is a graphical representation of the reduction of 50 mg/L $NaClO_4$, using the system described in FIG. 1 and PRZr51 oxidation-reduction catalyst, at 70 degrees C. using 50 mM ethanol as the reducing agent.
Figure 4:
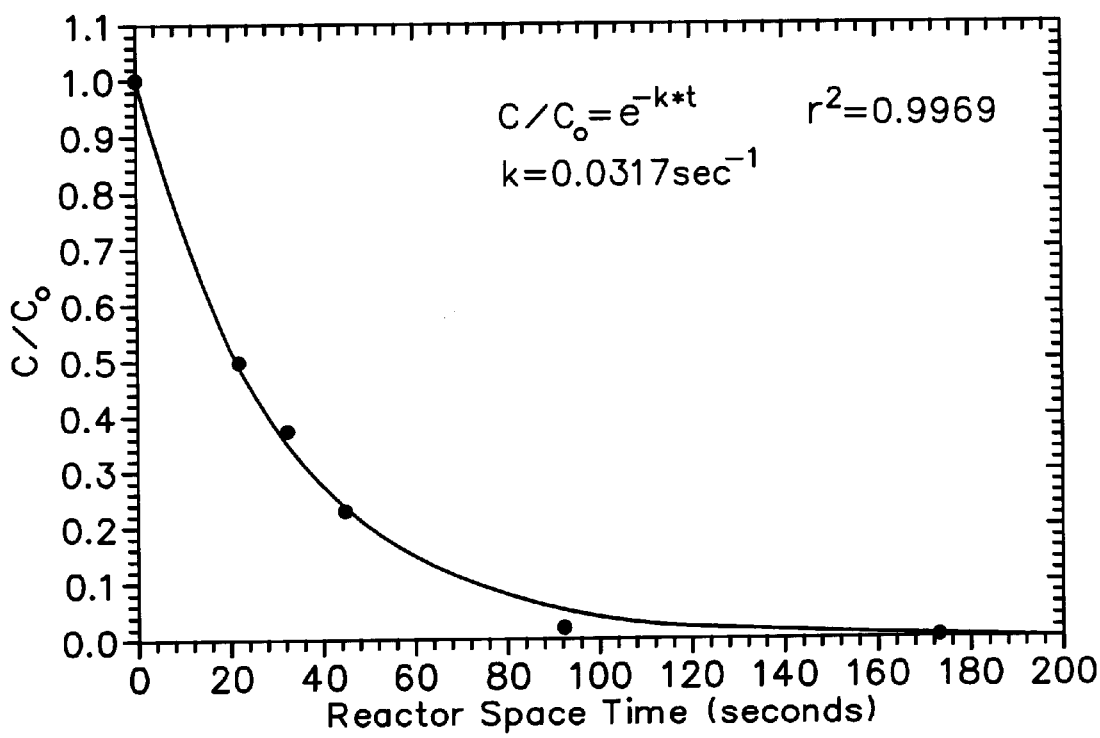
FIG. 4 is a graphical representation of the reduction of 50 mg/L $NaClO_4$, using the system described in FIG. 1 and PRZr51 oxidation-reduction catalyst, at 80 degrees C. using 50 mM ethanol as the reducing agent.
Figure 5:
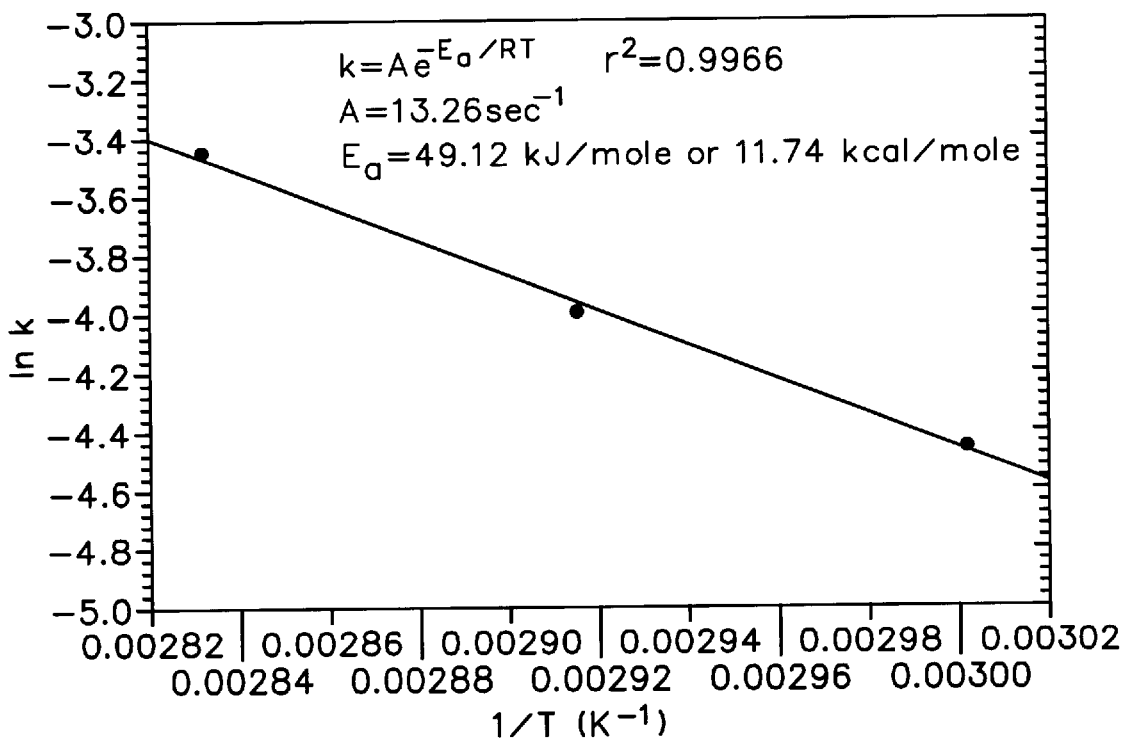
FIG. 5 is a graphical representation of an Arrhenius plot of the reduction of $NaClO_4$, using results of FIGS. 2–4.

The reaction kinetic experimental results at 60° C., 70° C., and 80° C. are shown in FIGS. 2–4, respectively. The flow rates were varied between 1.0 and 18.6 mL/min corresponding to reactor space times between 17 and 330 seconds. Good pseudo first order reaction kinetics were obtained for these reaction conditions. A 97 to 99.8% lowering of the influent NaClO$_4$ concentration was realized over this temperature range. The logarithms of each reaction rate constant were then plotted as a function of the reciprocal of the absolute temperature (° K.$^{-1}$) producing an excellent linear fit as shown in FIG. 5. Based on the slope of this line, the Arrhenius activation energy was determined to be 49.12 kJ/mole (11.74 kcal/mole) with a pre-exponential factor of 5.74×10$^5$ sec$^{-1}$. Based on these data, the extent of perchlorate reduction can be controlled by a combination of temperature and reactor residence time. Using a properly designed APCAR process, the elimination of perchlorates from ground and surface waters or a variety of waste waters is achievable by adjustment of temperature and catalyst contact time.

For example, a 200 μg/L perchlorate level in water can be lowered to below the provisional RfD) (i.e., 6 μg/L) at 60° C. after contact with the catalyst for 3 minutes. As the concentration of perchlorate increases and/or the solution composition changes, the reaction temperature and catalyst contact time can be adjusted to destroy perchlorate, reducing the concentration to acceptable values. At very low perchlorate levels significant destruction can be achieved at very low temperature.

Figure 6:
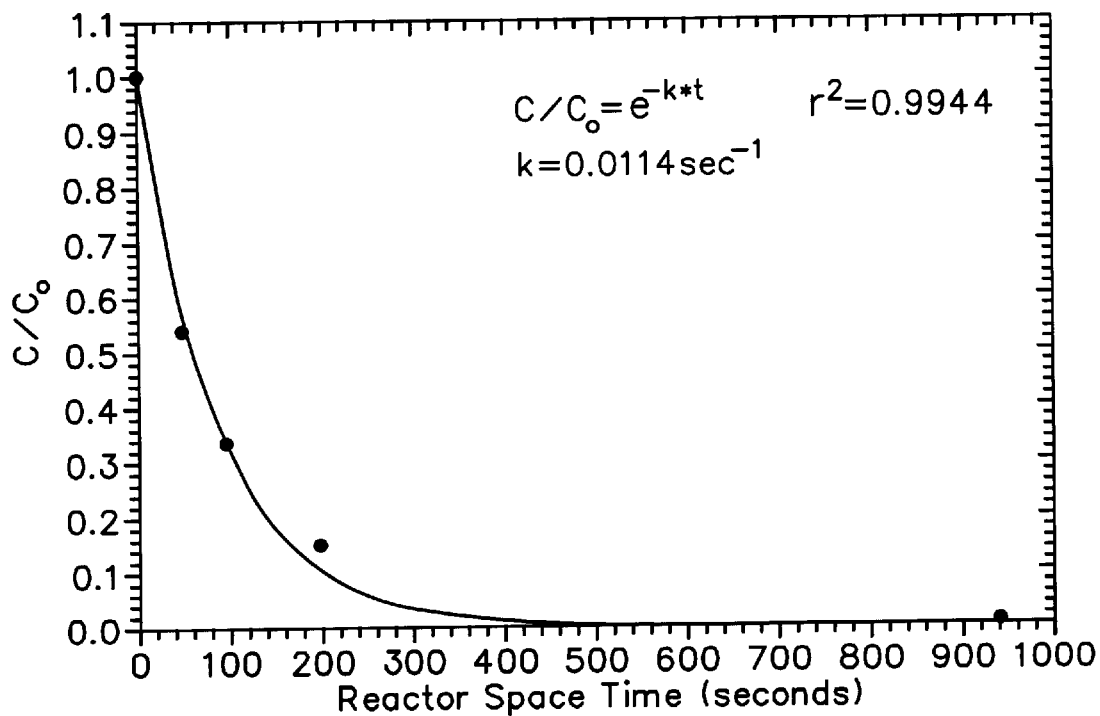
FIG. 6 is a graphical representation of the reduction of 20 mg/L $NaNO_3$, using the system described in FIG. 1 and PRZr51 oxidation-reduction catalyst, at 80 degrees C. using 20 mg/L ethanol as the reducing agent.

The reduction of nitrate was evaluated in the same reactor system using ethanol as the reductant. This system was challenged with 20 mg/L solution of NO$_3^-$ (as NaNO$_3$) containing 20 mg/L of ethanol at 80° C. The flow rate was varied between 0.5 and 10 mL/min corresponding to reactor space times between 42 and 942 seconds. Good pseudo first order kinetics were obtained over these reaction conditions. The results are shown in FIG. 6. The pseudo first order reduction rate was 0.0114 sec$^{-1}$. Under these conditions, a 95% reduction of the nitrate concentration can be achieved in ~260 seconds.

Figure 7:
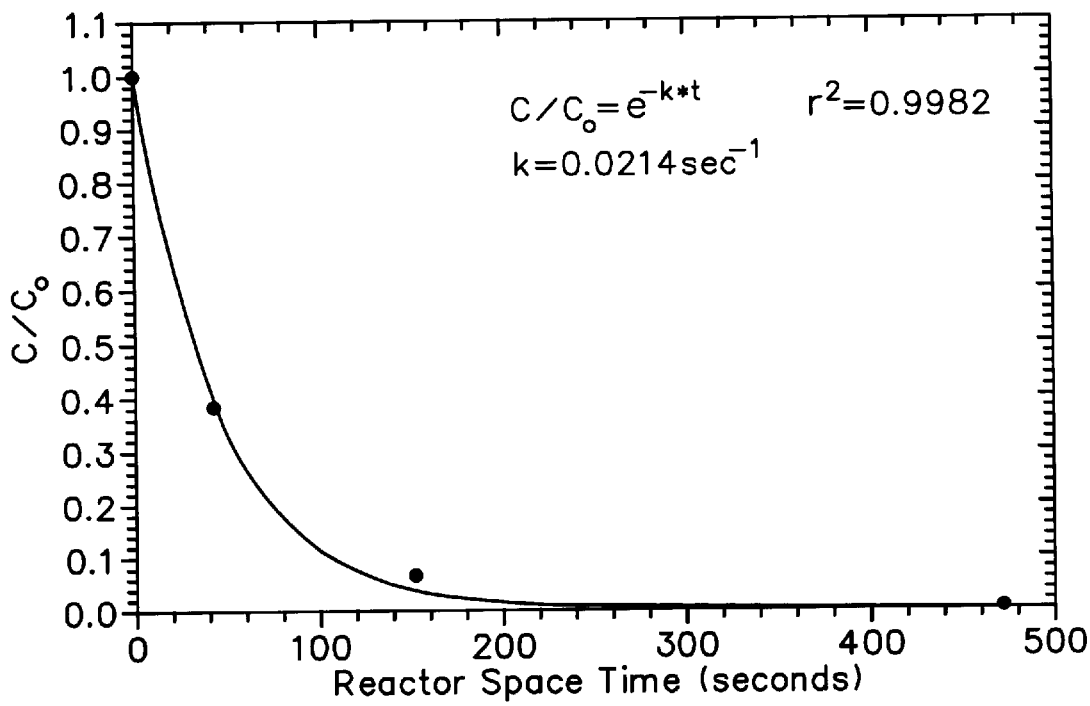
FIG. 7 is a graphical representation of the reduction of 30.6 mg/L $NaNO_3$, using the system described in FIG. 1 and PRZr51 oxidation-reduction catalyst, at 100 degrees C. using 20 mg/L ethanol as the reducing agent.

The reduction of 30.6 mg/L of NaNO$_3$ with 20 mg/L of ethanol as reductant was investigated at 100° C. FIG. 7 shows the destruction of nitrate as a function of reactor space time. The reaction rate determined from this curve was 0.0214 sec$^{-1}$. A 95% reduction of the nitrate concentration at 100° C. requires 140 seconds. Using the data at 80° and 100° C., the Arrhenius activation energy for this reaction is 34.5 kJ/mole (8.25 kcal/mole) with a pre-exponential factor of 1,445 sec$^{-1}$. Adjustment of either reaction temperature or the catalyst bed size can be used to ensure that the destruction of nitrate in a wide variety of water samples will meet regulatory limits as required.

These reduction data have demonstrated that both perchlorate and nitrate can be destroyed in water by the APCAR process using a non-toxic organic reductant such as ethanol in conjunction with high activity oxidation-reduction catalyst PRZr51 manufactured by Umpqua Research Company of Myrtle Creek. Furthermore, this can be accomplished at relatively low temperature with a variety of other reductants. Clearly, such a unit operation can be integrated into current drinking water or waste water treatment systems in a straightforward manner.

In experiments investigating reductants other than organic species, the APCAR system shown in FIG. 1 utilized hydrogen gas as the reductant. The introduction of dissolved hydrogen into the process stream is accomplished from a pressurized gas source via a membrane saturator or by direct injection. In the experimental apparatus, a membrane saturator is used. The concentration of dissolved hydrogen depends on the hydrogen pressure according to Henry's Law as shown in (4), $$H_k = \frac{pH_2}{\chi} \tag{4}$$

where $\chi$ is the mole fraction of hydrogen in water, pH$_2$ is the hydrogen pressure in atmospheres, and H$_k$ is the Henry's Law Constant. Since the $\chi$ is independent of temperature, the hydrogen pressure needed to maintain a fixed $\chi$ is dependent only on the Henry's Law Constant. At room temperature, the Henry's Law Constant for hydrogen is 77,600. Since Henrys Law Constant increases with temperature reaching a maximum at ~90° C., the reactor pressure must exceed the equilibration pressure to maintain a single phase.

The stoichiometry for the reaction between hydrogen and perchlorate is given by (5).

$$ClO_4^- + 4H_2 \rightarrow Cl^- + 4H_2O \tag{5}$$

Based on a 40 mg/L NaClO$_4$ concentration, a 35 psig (3.38 atm) hydrogen pressure at 22° C., and the complete conversion of perchlorate to chloride, a two fold excess of hydrogen was used during these runs. In the presence of excess hydrogen, the reaction becomes zero order with respect to the reductant and first order with respect to NaClO$_4$.

Figure 8:
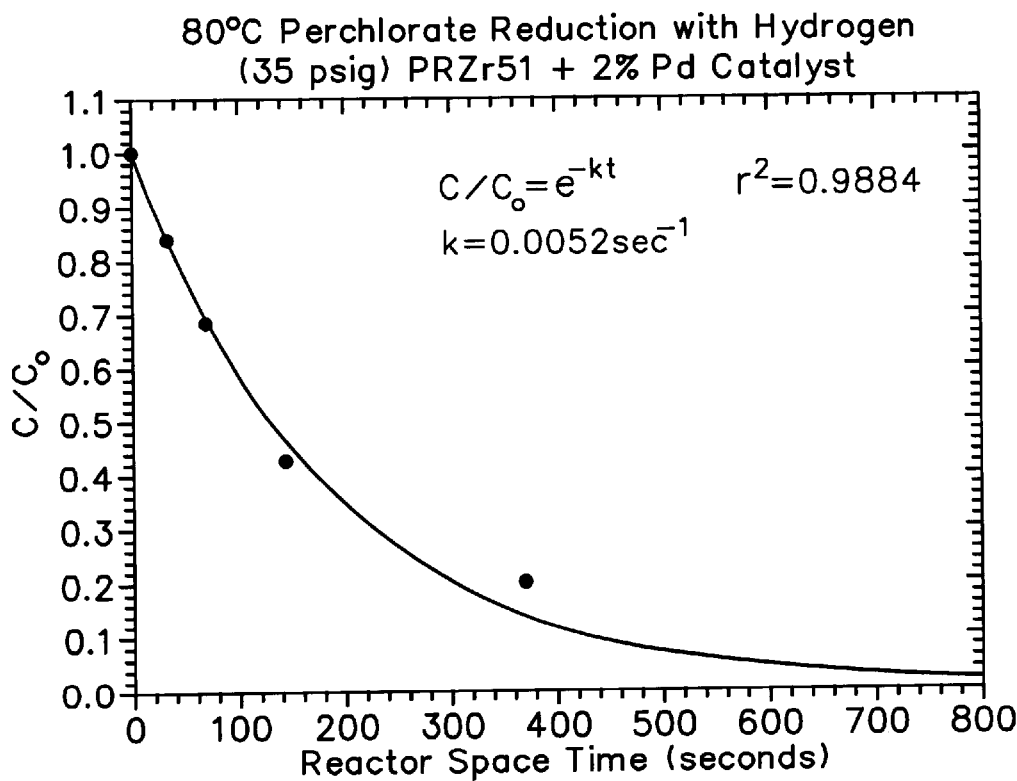
FIG. 8 is a graphical representation of the reduction of 50 mg/L $NaClO_4$, using the system described in FIG. 1 and PRZr51 plus 2% palladium oxidation-reduction catalyst, at 80 degrees C. using hydrogen as the reducing agent. Hydrogen Reduction of 50 mg/L $NaCl_4$ at 80° C. over the PRZr51+2%Pd Catalyst.
Figure 9:
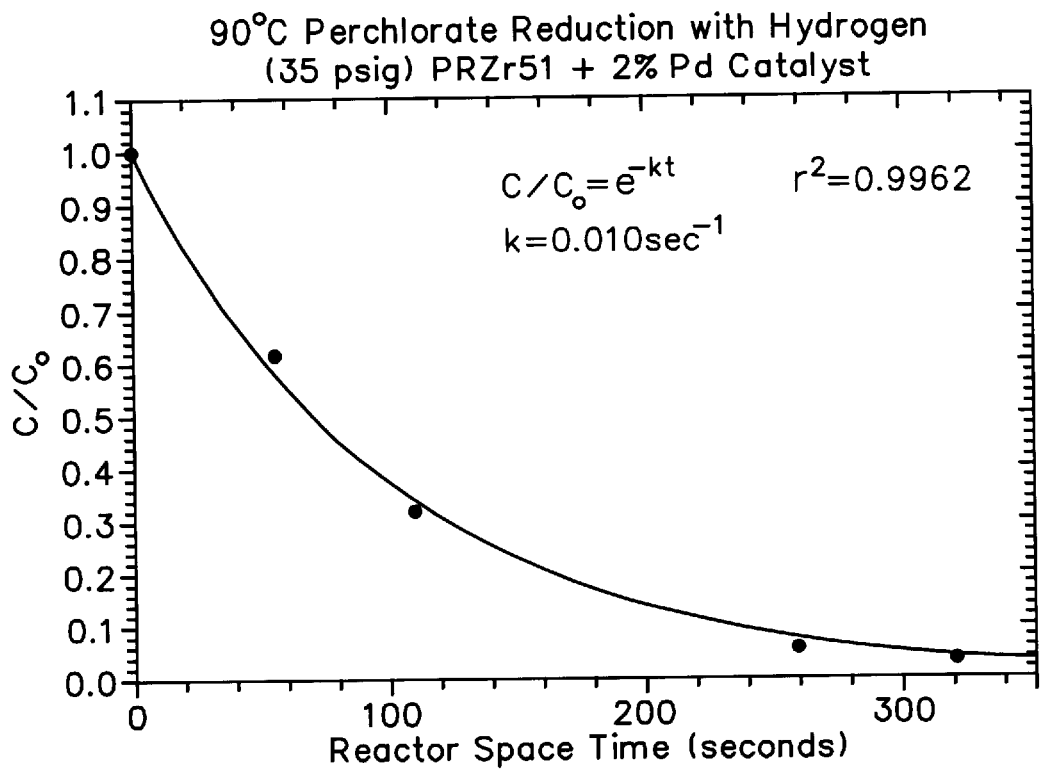
FIG. 9 is a graphical representation of the reduction of NaClO$_4$, using the system described in FIG. 1 and PRZr51 plus 2% palladium oxidation-reduction catalyst, at 90 degrees C. using hydrogen as the reducing agent.
Figure 10:
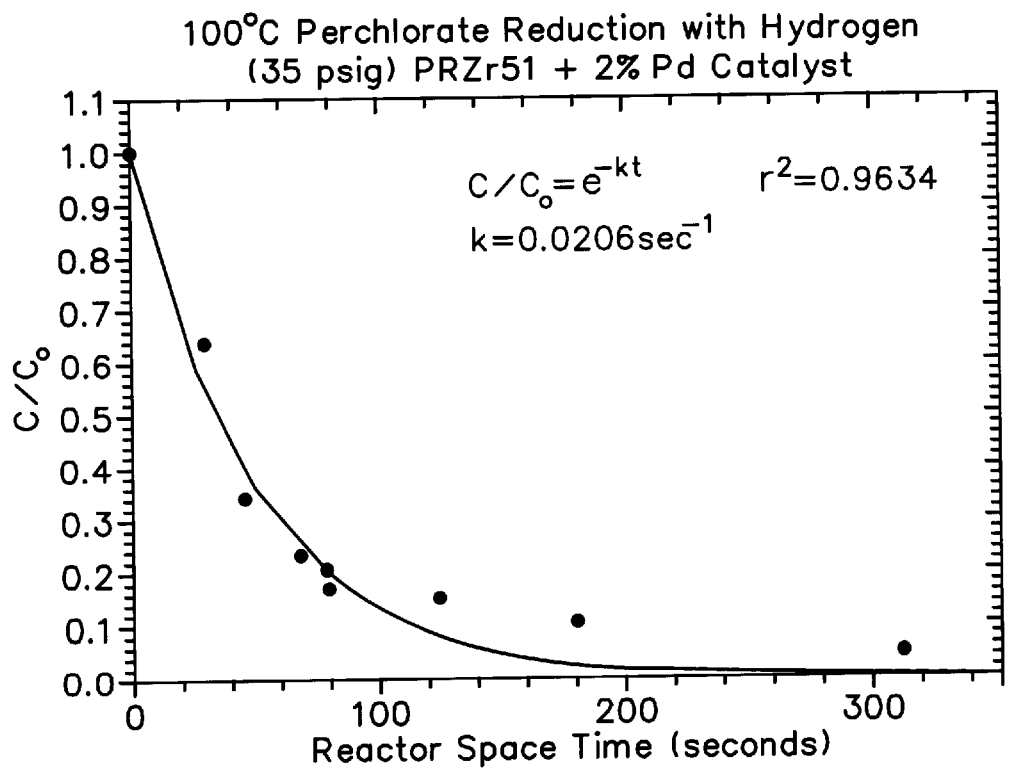
FIG. 10 is a graphical representation of the reduction of NaClO$_4$, using the system described in FIG. 1 and PRZr51 plus 2% palladium oxidation-reduction catalyst, at 100 degrees C. using hydrogen as the reducing agent.
Figure 11:
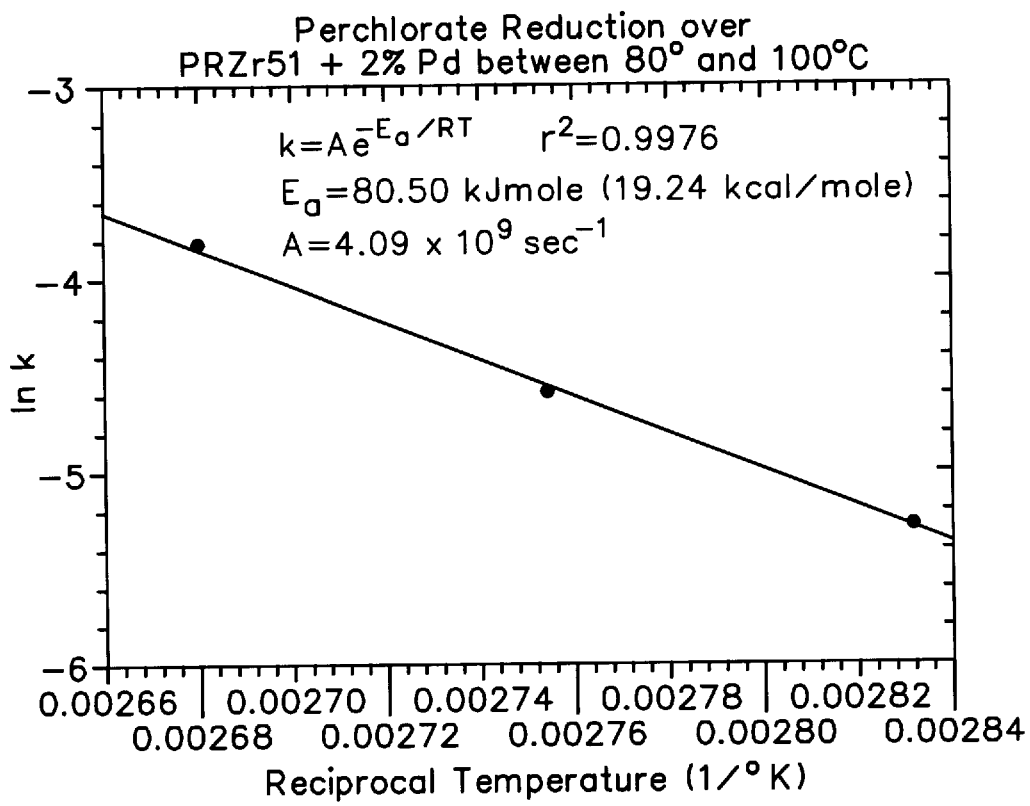
FIG. 11 is a graphical representation of an Arrhenius plot of the reduction of NaClO$_4$, using the system described in FIGS. 8–10.

The reaction kinetic experimental results at 80° C., 90° C., and 100° C. are shown in FIGS. 8–10, respectively. The flow rates were varied between 1.3 and 16.6 mL/min, corresponding to reactor space times between 29 and 369 seconds. Good pseudo first order reaction kinetics were obtained for these reaction conditions. The pseudo first order reaction rate constants were 0.0051, 0.0102, and 0.0207 sec$^{-1}$ at 80°, 90°, and 100° C., respectively. These values are lower than those obtained using ethanol as the reductant (i.e., 0.0116, 0.0185, and 0.0317 sec$^{-1}$ at 60°, 70°, and 80° C., respectively). The logarithms of each reaction rate constant were then plotted as a function of the reciprocal of the absolute temperature (° K$^{-1}$) producing an excellent linear fit as shown in FIG. 11. Based on the slope, the Arrhenius activation energy was determined to be 80.5 kJ/mole (19.24 kcal/mole) with a pre-exponential factor of 4.09×10$^9$ sec$^{-1}$.

When the PRZr51 catalyst was tested at 100° C., the reduction of NaClO$_4$ was considerably slower. The pseudo first order reaction rate constant was 0.0051 sec$^{-1}$. This is equivalent to the PRZr51+2% Pd catalyst at 80° C. Clearly, the presence of palladium increases the reduction rates of NaClO$_4$ using hydrogen as the reductant. The enhanced reaction rates are attributed to the availability of hydrogen at reduction sites due to the enhanced solubility of hydrogen in palladium.

Figure 14:
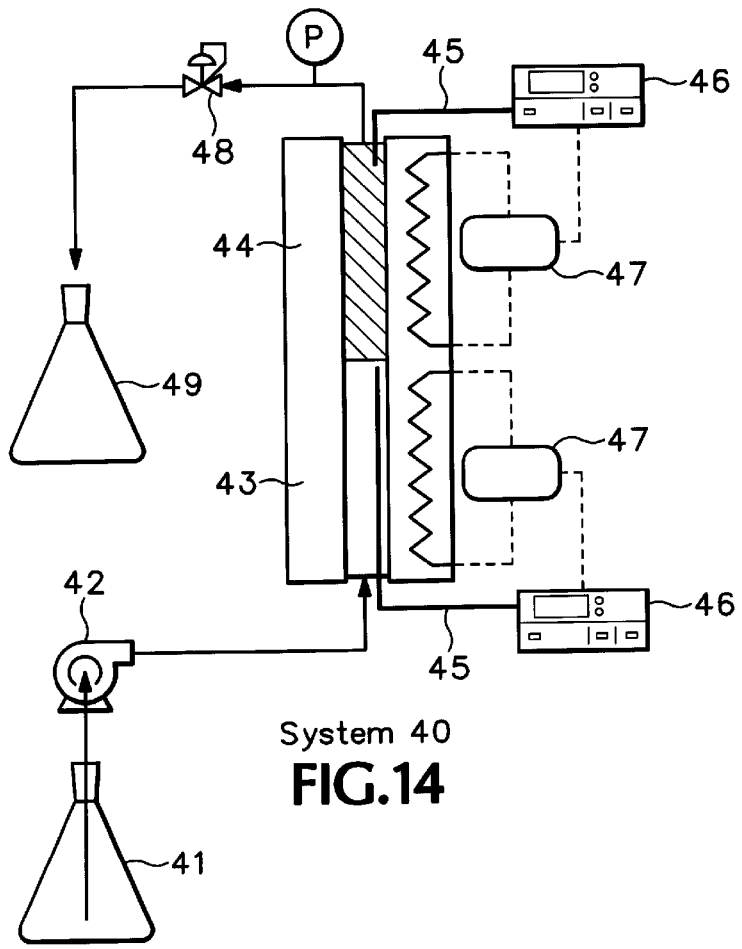
FIG. 14 is a schematic view of a system 40 of the present invention for destroying contaminants in a contaminant-containing aqueous stream using a non-organic reducing agent.

In experiments investigating inorganic reductants other hydrogen, the APCAR system 40 shown in FIG. 14. System 40 comprises a influent reservoir 41 from which an contaminant-containing aqueous feed stream is transferred by pump 42 into preheater 43, and in turn into reactor 44. Themocouples 45 read the inlet temperature into the preheater 43 and the outlet temperature exiting reactor 44. The inlet and outlet temperatures are regulated by temperature controllers 46 which in turn run the power controllers/resistive heating elements 47. A secondary regulator 48 controls the flow of product effluent from the reactor 44 which collects in effluent reservoir 49. System 40 utilizes ammonium chloride, NH$_4$Cl, as the reductant. Balancing the oxidation-reduction reaction between sodium perchlorate, NaClO$_4$, and NH$_4$Cl yields (6),

$$3NaClO_4 + 8NH_4Cl \rightarrow 4N_2 + 3NaCl + 8HCl + 12H_2O \tag{6}$$

After passage through the reactor 4, pH is lowered and perchlorate is reduced to chloride. The reactor 4 contains 20 cm³ of the PRZr51 catalyst.

The influent contained 50 mg/L NaClO$_4$ concentration and 330 mg/L NH$_4$Cl concentration. Assuming a complete conversion of perchlorate to chloride, a five fold excess of ammonium was used during these runs. In the presence of excess ammonium, the reaction becomes zero order with respect to the reductant.

Figure 12:
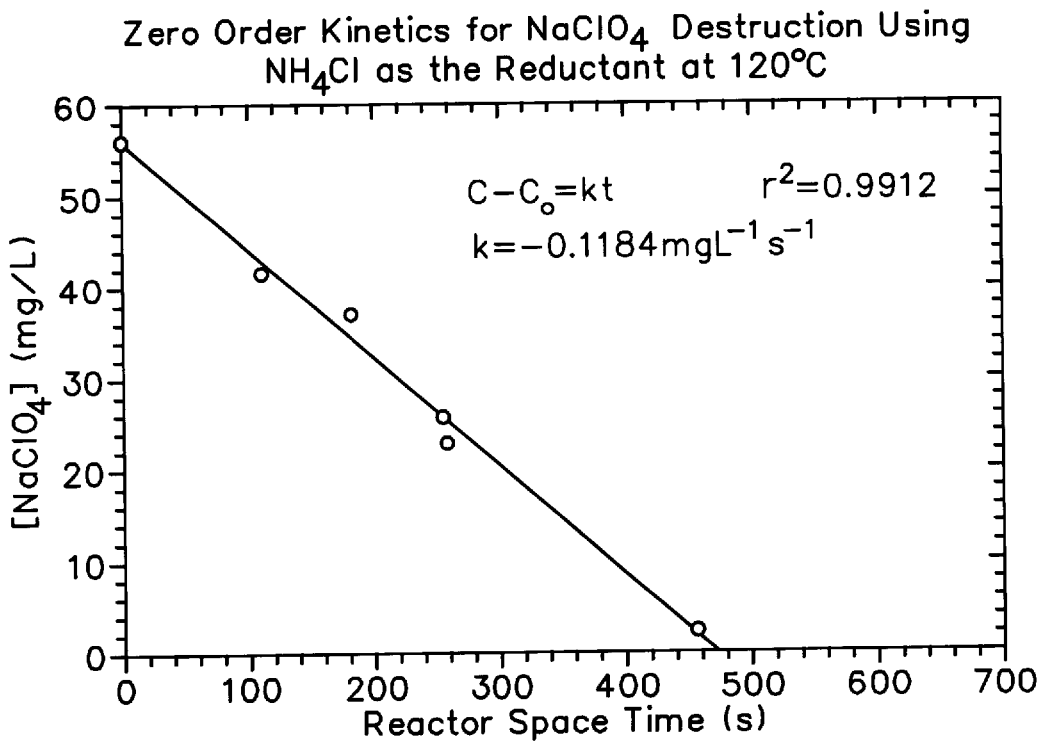
FIG. 12 is a graphical representation of the reduction of 50 mg/L NaClO$_4$, using the system described in FIG. 14 below, catalyzed by a PRZr51 oxidation-reduction catalyst, at 120 degrees C., using ammonium ions in the form of NH$_4$Cl as the reducing agent.
Figure 13:
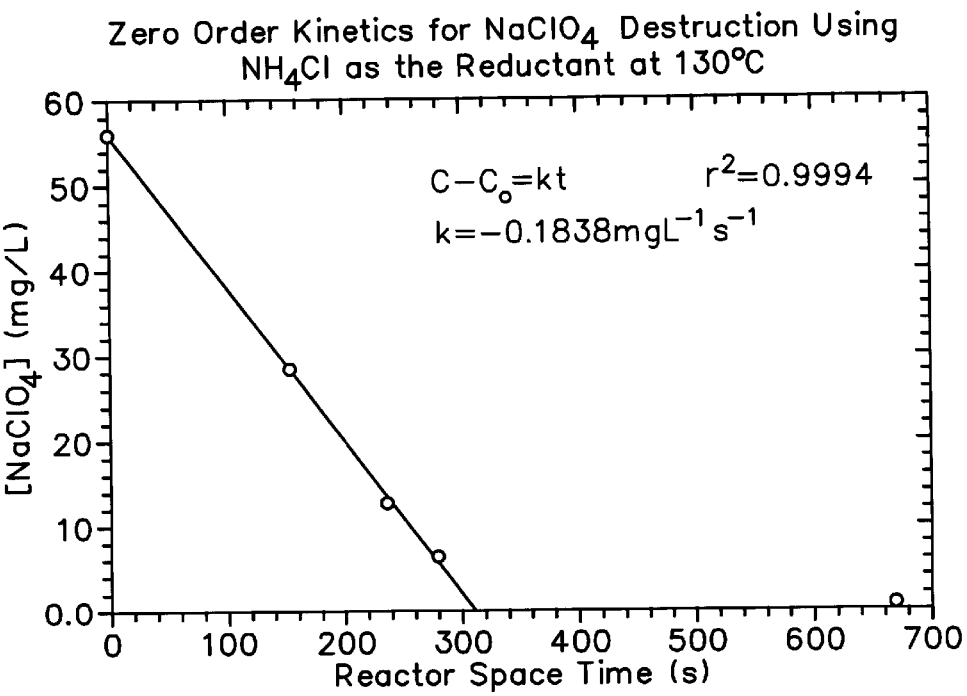
FIG. 13 is a graphical representation of the reduction of NaClO$_4$, using the system described in FIG. 14 below, at 130 degrees C., using ammonium ions in the form of NH$_4$Cl as the reducing agent.

The reaction kinetic experimental results at 120° C. and 130° C. are shown in FIGS. 12 and 13, respectively. The flow rates were varied between 0.71 and 4.62 mL/min, corresponding to reactor space times between 104 and 676 seconds. Good zero order reaction kinetics with respect to perchlorate reduction were obtained for these reaction conditions. The pseudo zero order reaction rate constants are 0.1184 and 0.1808 mg L$^{-1}$ sec$^{-1}$ at 120° and 130° C., respectively.

The oxidation-reduction catalyst used in these experiments, designated as PRZr51, is composed of 2 weight % platinum and 0.5 weight % ruthenium on a zirconia support. The preparation of this high activity reduction catalyst involves the homogeneous adsorption of aqueous ions containing ruthenium and platinum onto a zirconium oxide (i.e., ZrO$_2$) support. Other catalysts that are effective at oxidizing aqueous organic species using molecular oxygen should exhibit similar reduction behavior, since like PRZr51, they are all effective at reducing molecular oxygen and other oxygen sources using a variety of organic contaminants as a reductant. Other catalysts which should behave in this manner include platinum and ruthenium on supports such as activated carbon, titanium dioxide, silicon dioxide, and other transition metal oxides. Platinum alone and combinations of palladium have also been shown to function as effective oxidation catalysts. In particular, the addition of 2.0 weight % palladium to PRZr51 provided excellent performance when hydrogen was utilized as the reductant.

The development of a heterogeneous catalyst and a process that can efficiently utilize organic contaminants as a reductant to destroy perchlorate or nitrate at moderate temperatures and pressures is unique. Due to the extremely high activity of the PRZr51 catalyst, the reduction reaction occurs rapidly at 80° C. The reduction of inorganic species requires a catalyst, a reductant, and sufficient reaction temperature to drive the reaction forward. The PRZr51 catalyst will eliminate inorganic contaminants from drinking water supplies and also reduce the concentration of organic contaminants in the process.

This innovative technology is uniquely suited to environmental remediation. The utilization of organic contaminants as a reductant by an advanced catalytic reduction technology using this new heterogeneous catalyst provides the basis for a water reclamation system capable of processing highly contaminated water. Perchlorate or nitrate/nitrite contaminants in a variety of waters can be processed at low temperature and pressure. The PRZr51 catalyst has been shown to promote the rapid reaction of both NaClO$_4$, NH$_4$ClO$_4$, and NaNO$_3$ using a variety of reductants at temperatures between 60° and 80° C. These moderate treatment conditions reduce energy consumption and translate directly into the potential for economies in size, weight, and power.

In the case of perchlorate, the APCAR process can treat water at temperatures below 80° C. where the reaction occurs rapidly. The chief by-products are innocuous inorganic chlorine compounds, carbon dioxide, and water. The small amount of reductant required to destroy the 10 and 100 μg/L of perchlorate typically found in contaminated water is satisfied by the intrinsic organic levels of this water. Processing of more highly contaminated water with perchlorate levels greater than 5000 μg/L will require the addition of a reducing agent such as ethanol, sugar, or acetic acid. The APCAR system can operate as a self-contained process within a drinking water plant or at a wastewater treatment facility. The APCAR system eliminates perchlorate from drinking water or other contaminated water, does not produce a secondary more highly concentrated contaminant stream, and as an added benefit, reduces the concentration of organic contaminants.

In the case of nitrate/nitrite, the APCAR process can also treat water at low temperatures. The chief by-product is nitrogen gas, carbon dioxide, and water. The amount of reductant required to treat contaminated water depends on the contamination level which for nitrate/nitrite will be highly variable depending on the water's source. In general, due to the more typical level of nitrate/nitrite contamination ($\geq$10 mg/L), a reducing agent such as ethanol, sugar, or acetic acid will be needed albeit at low levels since background orangic levels in water will exhibit insufficient reducing capacity. As with perchlorate, the APCAR system will eliminate nitrate/nitrite without producing a secondary waste stream.

The end products for the reduction of perchlorate depends on the reductant, the catalyst, and the reaction conditions. For example, when ethanol is oxidized to carbon dioxide (CO$_2$) in the presence of sodium perchlorate (NaClO$_4$), several reactions are possible. This is shown in (7) through (9), where the formation of the more reduced forms of chlorine (i.e., chlorate, hypochlorite, and chloride) results in the more effective use of ethanol as a reducing agent.

$$CH_3CH_2OH + 6NaClO_4 \rightarrow 2CO_2 + 6NaClO_3 + 3H_2O \quad (7)$$

$$CH_3CH_2OH + 2NaClO_4 \rightarrow 2CO_2 + 2NaOCl + 3H_2O \quad (8)$$

$$CH_3CH_2OH + 1.5NaClO_4 \rightarrow 2CO_2 + 1.5NaCl + 3H_2O \quad (9)$$

The catalyst plays an important role in determining the reduction by-products. In the case of the PRZr51 catalyst, a high chloride residual determined by precipitation with AgNO$_3$ coupled with very low free chlorine residuals determined by method SM4500Cl$^{24}$ indicates that chloride is the chief by-product of NaClO$_4$ reduction.

In the case of nitrate, (10) and (11) show similar to produce nitrite or nitrogen. The absence of NO$_3^-$ or NO$_2^-$ in the effluent from NaNO$_3$ reduction (EPA 300.0) indicates that N$_2$ (g) is the chief by-product formed by the reaction th ethanol.[25]

$$CH_3CH_2OH + 12NO_3^- \rightarrow 12NO_2^- + 2CO_2 + 3H_2O \quad (10)$$

$$5CH_3CH_2OH + 12NO_3^- \rightarrow 6N_2 + 10CO_2 + 12OH^- \quad (11)$$

The following are the references cited above regarding the scope of the for perchlorate and nitrate problem, the health risks, and previous technologies used for perchlorate and nitrate/nitrite destruction.

REFERENCES

1. US EPA, Drinking Water Contaminant Candidate List, EPA 815-F-97-001, 1997.
2. California Department of Health Services, Division of Drinking Water and Environmental Management, Drinking Water Program, Perchlorate in California Drinking Water, 1997.

3. US EPA, 1992, Provisional Non-Cancer and Cancer Toxicity Values for Potassium Perchlorate (CASRN 7778-74-7) (Aerojet General Corp.), Memorandum from Joan S. Dollarhide, Superfind Health Risk Technical Support Center, Environmental Criteria and Assessment Office, Office of Research and Development, to Dan Stralka, US EPA Region IX.
4. US EPA, 1995, Correspondence from Joan S. Dollarhide, National Center for Environmental Assessment, Office of Research and Development, to Mike Girrard, Chairman, Perchlorate Study Group.
5. Standbury,J. B. and Wyngaarden,J. B., "Effect of perchlorate on the human thyroid gland.", Metabolism, 1, 533–539, 1952.
6. Godley,A. F. and J. B.Stanbury. "Preliminary Experience in the Treatment of Hyperthyroidism with Potassium Perchlorate" Endocrinology. 14, 70–78, 1954.
7. Crooks,J. and E. J.Wayne. "A Comparison of Potassium Perchlorate, Methylthiouracil, and Carbimazole in the Treatment of Thyrotoxicosis", Lancet., 1, 401–404, 1960.
8. Morgans,M. E. and W. R.Trotter. "Potassium Perchlorate in Thyrotoxicosis", Br. Med. J., 2:1086–1087. 1960.
9. Hobson,Q. J. G. "Aplastic Anemia due to Treatment with Potassium Perchlorate", Br. Med. J., 1, 1368–1369, 1961.
10. Johnson,R. S. and W. G.Moore. "Fatal Aplastic Anemia after Treatment of Thyrotoxicosis with Potassium Perchlorate", Br. Med. J., 1, 1369–1371, 1961.
11. Fawcett,J. W. and C. W. F.Clarke. "Aplastic Anemia due to Potassium Perchlorate", Br. Med. J., 1, 1537, 1961.
12. Krevans,J. R., S. P.Asper, Jr. and W. F.Rienhoff. "Fatal Aplastic Anemia Following the Use of Potassium Perchlorate in Thyrotoxicosis", J. Amer. Med. Assoc., 181 (2), 162–164, 1962.
13. Gjemdal,N. "Fatal Aplastic Anemia Following the Use of Potassium Perchlorate in Thyrotoxicosis". Acta Med. Scand., 174(2), 129–131, 1963.
14. Barzilai, D. and Sheinfeld, M., "Fatal Complications Following the Use of Potassium Perchlorate in Thyrotoxicosis". Israel J. Med. Sci., 301(3), 190–199, 1966.
15. Connell,J. M. C. "Long-term Use of Potassium Perchlorate", Postgrad Med. J., 57, 516–517, 1981.
16. Burgi,H., M.Benguerel, J.Knopp, H.Kohler, and H.Studer. "Influence of Perchlorate on the Secretion of Non-thyroxine Iodine by the Normal Human Thyroid Gland", Europ. J. Clin. Invest., 4, 65–69, 1974.
17. Brabant,G., P.Bergman, C. M.Kirsch, J.Kohrle, R. D.Resch, and A.vonzur Muhlen. "Early Adaptation of Thyrotropin and Thyroglobulin Secretion to Experimentally Decreased Iodine Supply in Man", Metabolism., 41, 1093–1096, 1992.
18. Mannisto,P. T., T.Rantum, and J.Leppaluoto. "Effects of Methylmercaptoimidazole (MMI), Propylthiouracil (PTU), Potassium Perchlorate ($KClO_4$) and Potassium Iodide (KI) on the Serum Concentrations of Thyrotrophin (TSH) and Thyroid Hormones in the Rat", Acta Endocrin., 91, 271–281, 1979.
19. Kessler,F. J. and H. J.Krunkemper. "Experimental Thyroid Tumors Caused by Many Years of Potassium Perchlorate Administration", Klin. Wochenschr., 44, 1154–1156, 1966.
20. Brooks AirForce Military Home Page. Demonstration of Ammonium Perchlorate Degredation. www.brooks.af.mil/HSC/AL/EQ/prod13.ht, 1997.
21. US EPA Regulated Inorganic Contaminants in Water www.epa.gov/OGWDW/dwh/t-ion/ioc-t.txt.
22. Hseu, T. M. and Rechnitz, A., "Analytical study of a perchlorate ion selective membrane electrode.", Anal. Lett., 1, 629–640, 1968.
23. Press, W. H., Flannery, B. P., Teukolsky, S. A., and Vetterling, W. T., Numerical Recipes: The Art of Scientific Computing, Cambridge, N.Y., 1986.
24. Standard Methods for the Examination of Water and Wastewater—19th Edition, edited by A. D. Eaton, L. S. Clesceri, A. E. Greenberg, and M. A. H. Franson, American Public Health Association, Washington, D.C., 1995.
25. Methods for Chemical Analysis of Water and Wastewater, U.S. Environmental Protection Agency, Cincinnati, Ohio, 1997.
26. Mussan, A. E. and Sukhotin, A. M., Russ. J. Inorg. Chem., 4,276, 1959.
27. Levy, J. B., J.Phys. Chem., 66, 1092, 1963.
28. Heath, G. A. and Majer, J. R., Trans. Faraday Soc., 60, 1783, 1964.
29. Sibbet, D. J. and Lobato, J. M., "Investigation of the mechanism of combustion of composite solid propellants", Aerojet Report N. 1782, Aerojet-General Corp., Azusa, Calif., 1960.
30. Swaddle, T. W., Miasek, V. I., and Henderson, M. P., "Kinetics of Thermal Decomposition of Aqueous Perchloric Acid", Can. J. Chem., 49, 317–324, 1971.
31. Korenkov, V. N., Romanenko, V. I., Kuznetsov, S. I., and Voronov, J. V., "Process for purification of industrial waste waters from perchlorates and chlorates", U.S. Pat. No. 3,943,055, 1976.
32. Mower, G. L., "Perchlorate removal process", U.S. Pat. No. 5,382,265, 1995.
33. Wanngard, C. J., "Process for the reduction of perchlorate in electrolytes used for the production of chlorate", U.S. Pat. No. 5,063,041, 1991.
34. Cawlfield, D. W. and Kaczur, J. J., Chlorine dioxide generation using inert load of sodium perchlorate", U.S. Pat. No. 5,322,598, 1994.
35. Brown, G. M. "The reduction of chlorate and perchlorate ions at an active titanium electrode", J. Electroanal. Chem., 198, 319–330, 1986.
36. Process Design Manual for Nitrogen Control, Office of Technology Transfer of the US EPA, 1975.
37. Bishop, D. F., and Stamberg, J. B., "Removal of Nitrogen and Phosphorus from Waste Water", U.S. Pat. No. 3,617,540, 1971.
38. Ganczarczyk, J. J. and Sabaratnam, S., "Nitrification Process in Waste Water Treatment", U.S. Pat. No. 4,720, 344, 1988.
39. Guter. G. A, "Removal of nitrate from water supplies using a tributyl amine strong base anion exchange resin", U.S. Pat. No. 4,479,877, 1984.
40. Murphy, A. P., "Chemical process for the denitrification of water,"U.S. Pat. No. 5,069,800, 1991.
41. Akse, J. R., and Jolly, C. D., "Catalytic Oxidation for Treatment of ECLSS and PMMS Waste Streams", Technical Paper Series SAE 911539, presented 21st International Conference on Environmental Systems, San Francisco, Jul. 15–18, 1991.
42. Akse, J. R., "Catalytic Methods using Molecular Oxygen for Treatment of PMMS and ECLSS Waste Streams", Final Report, Contract NAS8-38490, NASA-MSFC, 1992.
43. Akse, J. R., Thompson, J., Scott, B., Jolly, C., and Carter, D. L., "Catalytic Oxidation for Treatment of ECLSS and PMMS Waste Streams", Technical Paper SAE 921274, presented 22nd International Conference on Environmental Systems, Seattle, Jul. 13–16, 1992.
44. Atwater, J. E., Akse, J. R., McKinnis, J. A, and Thompson, J. O., "Low Temperature Aqueous Phase Catalytic Oxidation of Phenol", Chemosphere, 34(1), 203–212, 1997.

45. Atwater, J. E., Akse, J. R., McKinnis, J. A, and Thompson, J. O., "Aqueous Phase Heterogeneous Catalytic Oxidation of Trichloroethylene", Appl. Catal. B., 11, L11–L18, 1996.
46. Atwater, J. E., Akse, J. R., and Thompson, J. O., "Reactor Technology for Aqueous Phase Catalytic Oxidation of Organics", Phase I Final Report submitted to the U.S. Air Force, Environics Directorate, Tyndall AFB, Contract No. F08637 C6022, 1996.
47. Akse, J. R., Atwater, J. E., Schussel, L. J., and Thompson, J. O., "Electrochemically Generated, Hydrogen Peroxide Boosted Aqueous Phase Catalytic Oxidation", Final Report NASA Contract NAS9-19281, 1995.
48. Akse, J. R., et al., "In Situ Hydrogen peroxide Generation for Use as a Disinfectant and as an Oxidant for Water Recovery by Aqueous Phase Catalytic Oxidation", SAE Technical Paper Series 961521, presented at the 26th International Conference on Environmental Systems, Monterey, 1996.
49. Akse, J. R., Atwater, J. E., Schussel, L. J., Thompson, J. O., and Wheeler, R. R, Electrochemical Water Recovery Process for Treatment of Urine and Other Biological Waste Streams, Final Report Contract NAS9-18528, Prepared for Johnson Space Center, June 1993.
50. Akse, J. R., Atwater, J. E., Thompson, J. O., and Wheeler, R. R., Jr., A Breadboard Electrochemical Water Recovery System for Producing Potable Water from Composite Wastewater Generated in Enclosed Habitats, in Water Purification by Photocatalytic, Photochemical, and Electrochemical Processes, Rose, T. L., Conway, B. E., Murphy, O. J., and Rudd, E. J, Eds., Electrochemical Society, 1994.
51. Hamilton, C. E., Teal, L. J., and Kelly, J. A., U.S. Pat. No. 3,442,802, May, 1969.
52. Sadana, A., and Katzer, J. R., Catalytic Oxidation of Phenol in Aqueous Solution over Copper Oxide, Ind. Eng. Chem., Fundam., 13, 127, 1974.
53. Baldi, G., Goto, S., Chow, C.-K., and Smith, J. M., 1974, Catalytic Oxidation of Formic Acid in Water. Intraparticle Diffusion in Liquid-Filled Pores, Ind. Eng. Chem., Process Des. Develop., 13, 447.
54. Goto, S., and Smith, J. M., Trickle-Bed Reactor Performance. I. Holdup and Mass Transfer Effects, AIChE J., 21, 706, 1975.
55. Goto, S., and Smith, J. M., Trickle-Bed Reactor Performance. II. Reaction Studies, AIChE J., 21, 714, 1975.
56. Levec, J., and Smith, J. M., Oxidation of Acetic Acid Solutions in a Trickle-Bed Reactor, AlChE J., 22, 159, 1976.
57. Levec, J., Herskowitz, M., and Smith, J. M., An Active Catalyst for the Oxidation of Acetic Acid Solutions, AIChE J., 22, 919, 1976.
58. Box, E. O., and Farha, F., Jr., Polluted Water Purification, U.S. Pat. No. 3,823,088, July, 1974.
59. Levec, J., Catalytic Oxidation of Toxic Organics in Aqueous Solution, Appl. Catal., 63, L1, 1990.
60. Levec, J., German Patent Application P 39 38 835.2, November, 1989.
61. Okada, N., Nakanishi, Y., and Harada, Y., Process for Treating Waste Water, U.S. Pat. No. 4,141,828, February, 1979.
62. Mitsui, K., Terui, S., Sano, K., Kanazaki, T., Nishikawa, K., and Inoue, A., Method for Treatment of Waste Water, U.S. Pat. No. 4,751,005, June, 1988.
63. Harada, Y., Nakashiba, A., Matuura, H., Okino, T., Fujitani, H., Yamasaki, K., Doi, Y., and Yurugi, S., Process for Treating Waste Water by Wet Oxidations, U.S. Pat. No. 4,699,720, October, 1987.
64. Akse, J. R., Atwater, J. E., Schussel, L. J., and Verostko, C. E., Development and Fabrication of a Breadboard Electrochemical Water Recovery System,Technical Paper SAE 932032, presented at 23rd International Conference on Environmental Systems, Colorado Springs, July 1993.

What is claimed is:

1. A process for destroying contaminants in a contaminant-containing aqueous stream, which comprises: providing said contaminant-containing aqueous feed stream including an initial amount of at least one of a group of contaminants including perchlorates, nitrates, and nitrites;

providing a reducing agent in said contaminant-containing aqueous feed stream;

providing both organic and inorganic reducing agents which are soluble in the aqueous stream and when oxidized form soluble by-products heating the reducing agent-containing, contaminant-containing aqueous stream; and contacting said heated contaminant-containing aqueous stream with an oxidation-reduction catalyst for a period of time sufficient for reducing the initial amount of each of said perchlorates, nitrates, and nitrites contaminants by at least about 90%.

2. The process of claim 1, which further includes the step of introducing a non-toxic reducing agent to said contaminant-containing aqueous feed stream.

3. The process of claim 1, wherein said reducing agent is non-toxic.

4. The process of claim 1, wherein said reducing agent comprises a carbohydrate, an alcohol, an organic acid, dissolved hydrogen, ammoniacal nitrogen, hydrogen peroxide, urea, chloramines, or hydrazine hydrachloride.

5. The process of claim 1, which further includes the step of contacting said heated contaminant-containing aqueous stream with a metallic or metal oxide oxidation-reduction catalyst.

6. The process of claim 5, wherein said metallic oxidation-reduction catalyst comprises at least one of platinum, palladium, and ruthenium.

7. The process of claim 1, which further includes the step of contacting the reducing agent-containing, contaminant-containing aqueous stream with the oxidation-reduction catalyst for a period of time of not more than about 1500 seconds.

8. The process of claim 1, which further includes the step of heating the reducing agent-containing, contaminant-containing aqueous stream to a temperature of not more than about 250 degrees C.

9. The process of claim 1, wherein said contaminant-containing aqueous feed stream comprises a contaminant-containing aqueous brine feed stream.

10. The process of claim 1, wherein carbon dioxide and water are the predominant by-products after destroying said contaminants in a contaminant-containing aqueous stream.

11. A process for using an oxidation-reduction catalyst, which comprises:

providing a contaminant-containing aqueous feed stream including an initial amount of at least one of a group of contaminants including perchlorates, nitrates, and nitrites;

providing a reducing agent in said contaminant-containing aqueous feed stream;

heating the reducing agent-containing, contaminant-containing aqueous stream; and contacting said heated contaminant-containing aqueous stream with said oxidation-reduction catalyst for a period of time sufficient for reducing the initial amount of any of said perchlorates, nitrates, and nitrites contaminants by at least about 90%.

12. The process of claim 11, which further includes the step of introducing a non-toxic reducing agent to said contaminant-containing aqueous feed stream.

13. The process of claim 11, wherein said reducing agent is non-toxic.

14. The process of claim 11, wherein said reducing agent comprises a carbohydrate, an alcohol, an organic acid, dissolved hydrogen, ammonical nitrogen, hydrogen peroxide, urea, chloramines, or hydrazine hydrachloride.

15. The process of claim 11, which further includes the step of contacting said heated contaminant-containing aqueous stream with a metallic or metal oxide oxidation-reduction catalyst.

16. The process of claim 15, wherein said metallic oxidation-reduction catalyst comprises at least one of platinum, palladium, and ruthenium.

17. The process of claim 11, which further includes the step of contacting the reducing agent-containing, contaminant-containing aqueous stream with the oxidation-reduction catalyst for a period of time of not more than about 1500 seconds.

18. The process of claim 11, which further includes the step of heating the reducing agent-containing, contaminant-containing aqueous stream to a temperature of not more than about 250 degrees C.

19. The process of claim 11, wherein said contaminant-containing aqueous feed stream comprises a contaminant-containing aqueous brine feed stream.

20. The process of claim 11, wherein carbon dioxide and water are the predominant reductant by-products after destroying said contaminants in a contaminant-containing aqueous stream.

21. An oxidation-reduction catalyst system, which comprises: an oxidation-reduction catalytic material which is capable of reducing by at least about 90% the initial amount of any one of a perchlorate, nitrate, and nitrite contaminant in a contaminant-containing aqueous feed stream, said contaminant-containing aqueous feed stream including a reducing agent.

22. An oxidation-reduction catalyst, which comprises an oxidation-reduction catalytic material which, when combined with a reducing agent disposed in said contaminant-containing aqueous feed stream, is capable of reducing by at least about 90% an initial amount of any one of a perchlorate, nitrate, and nitrite contaminant in a contaminant-containing aqueous feed stream.

* * * * *